United States Patent
Desai et al.

(10) Patent No.: US 9,294,545 B2
(45) Date of Patent: Mar. 22, 2016

(54) FAST JOIN OF PEER TO PEER GROUP WITH POWER SAVING MODE

(75) Inventors: Mitesh K. Desai, Redmond, WA (US); Amer A. Hassan, Kirkland, WA (US); Mukund Sankaranarayan, Sammamish, WA (US); Henrique Filgueiras, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 12/970,069

(22) Filed: Dec. 16, 2010

(65) Prior Publication Data
US 2012/0158981 A1  Jun. 21, 2012

(51) Int. Cl.
*H04L 29/08* (2006.01)

(52) U.S. Cl.
CPC ............ *H04L 67/04* (2013.01); *H04L 67/1046* (2013.01); *H04L 67/1051* (2013.01); *H04L 67/1093* (2013.01); *Y02B 60/46* (2013.01)

(58) Field of Classification Search
USPC .......... 709/230; 370/254, 310–329; 455/7–14
See application file for complete search history.

(56) References Cited

U.S. PATENT DOCUMENTS

| | | |
|---|---|---|
| 4,949,299 A | 8/1990 | Pickett |
| 5,682,382 A | 10/1997 | Shepard |
| 5,729,682 A | 3/1998 | Marquis et al. |
| 6,288,749 B1 | 9/2001 | Freadman |
| 6,317,490 B1 | 11/2001 | Cameron et al. |
| 6,338,046 B1 | 1/2002 | Saari et al. |
| 6,343,205 B1 | 1/2002 | Threadgill et al. |
| 6,553,060 B2 | 4/2003 | Souissi et al. |
| 6,628,965 B1 | 9/2003 | Larosa et al. |
| 6,665,709 B1 | 12/2003 | Barron |
| 6,711,617 B1 | 3/2004 | Bantz et al. |
| 6,789,228 B1 | 9/2004 | Merril et al. |

(Continued)

FOREIGN PATENT DOCUMENTS

| | | |
|---|---|---|
| CN | 1571341 A | 1/2005 |
| CN | 1592210 A | 3/2005 |

(Continued)

OTHER PUBLICATIONS

Wi-Fi Alliance: FAQs—Published Date: 2010 http://www.wi-fi.org/knowledge_center_overview.php?type=2.

(Continued)

*Primary Examiner* — Habte Mered
*Assistant Examiner* — Yaotang Wang
(74) *Attorney, Agent, or Firm* — Sunah Lee; Judy Yee; Micky Minhas

(57) ABSTRACT

A wireless peer-to-peer protocol that supports fast and low power joining to an existing group. The protocol may be an extension of a peer-to-peer protocol that supports a sleep state for a device controlling the group. When a device is seeking to join a group at a time when the controlling device is in a sleep state, another device that has information about the controlling device may provide information to the joining device that may then be used by the joining device to more quickly, and using less power, synchronize with the controlling device. The information may include information about a channel used by the controlling device or about timing of availability of the controlling device. The information may also reveal whether the group provides a service being sought by the joining device or may otherwise influence whether the joining device will attempt to join a group.

20 Claims, 7 Drawing Sheets

(56) References Cited

U.S. PATENT DOCUMENTS

| | | |
|---|---|---|
| 6,823,379 B1 | 11/2004 | Heckel et al. |
| 7,020,472 B2 | 3/2006 | Schmidt |
| 7,027,808 B2 | 4/2006 | Wesby |
| 7,058,696 B1 | 6/2006 | Phillips et al. |
| 7,107,009 B2 | 9/2006 | Sairanen et al. |
| 7,110,843 B2 | 9/2006 | Pagnano et al. |
| 7,177,288 B2 | 2/2007 | Mooney et al. |
| 7,194,278 B1 | 3/2007 | Cook |
| 7,274,911 B2 | 9/2007 | Li |
| 7,280,978 B1 | 10/2007 | Joao |
| 7,290,132 B2 | 10/2007 | Aboba |
| 7,349,342 B2 | 3/2008 | Carpenter et al. |
| 7,400,253 B2 | 7/2008 | Cohen |
| 7,412,534 B2 | 8/2008 | Tsang et al. |
| 7,461,253 B2 | 12/2008 | Braskich et al. |
| 7,496,637 B2 | 2/2009 | Han et al. |
| 7,512,401 B2 | 3/2009 | Muhonen et al. |
| 7,558,604 B2 | 7/2009 | Narayanaswami et al. |
| 7,562,129 B1 | 7/2009 | Lee et al. |
| 7,577,125 B2 | 8/2009 | Abhishek |
| 7,580,678 B2 | 8/2009 | Byman-Kivivuori et al. |
| 7,589,693 B2 | 9/2009 | Locke |
| 7,640,213 B2 | 12/2009 | Reunert et al. |
| 7,721,093 B2 | 5/2010 | Sundararajan |
| 7,729,689 B2 | 6/2010 | Chakraborty et al. |
| 7,751,317 B2 | 7/2010 | Toyama et al. |
| 7,769,394 B1 | 8/2010 | Zhu |
| 7,783,019 B2 | 8/2010 | Mahone et al. |
| 7,925,739 B2 | 4/2011 | Kocho et al. |
| 7,962,854 B2 | 6/2011 | Vance et al. |
| 8,014,415 B2 | 9/2011 | Alapuranen |
| 8,095,111 B2 | 1/2012 | Henry, Jr. et al. |
| 8,098,803 B1 | 1/2012 | Croak et al. |
| 8,204,013 B2 | 6/2012 | Lewis |
| 8,254,992 B1 | 8/2012 | Ashenbrenner et al. |
| 8,260,998 B2 | 9/2012 | Ganesh et al. |
| 8,285,250 B2 | 10/2012 | Rubin et al. |
| 8,323,040 B2 | 12/2012 | Prest |
| 8,326,958 B1 | 12/2012 | Raleigh |
| 8,397,982 B2 | 3/2013 | Slaby et al. |
| 8,437,736 B2 | 5/2013 | Rubin et al. |
| 8,565,928 B2 | 10/2013 | Venkatakrishnan et al. |
| 8,589,991 B2 | 11/2013 | Hassan et al. |
| 8,621,097 B2 | 12/2013 | Venkatakrishnan et al. |
| 8,633,616 B2 | 1/2014 | Soar |
| 8,659,565 B2 | 2/2014 | Sirpal et al. |
| 8,977,731 B2 | 3/2015 | Venkatakrishnan et al. |
| 2001/0021950 A1 | 9/2001 | Hawley et al. |
| 2001/0037399 A1 | 11/2001 | Eylon et al. |
| 2001/0042124 A1 | 11/2001 | Barron |
| 2001/0046298 A1 | 11/2001 | Terada et al. |
| 2002/0067268 A1 | 6/2002 | Lee et al. |
| 2002/0116485 A1 | 8/2002 | Black et al. |
| 2002/0120935 A1 | 8/2002 | Huber et al. |
| 2002/0143819 A1 | 10/2002 | Han et al. |
| 2002/0154751 A1 | 10/2002 | Thompson et al. |
| 2002/0156876 A1 | 10/2002 | Hartman et al. |
| 2003/0142651 A1 | 7/2003 | Matta et al. |
| 2003/0187992 A1 | 10/2003 | Steenfeldt et al. |
| 2003/0231586 A1 | 12/2003 | Chheda |
| 2004/0002305 A1 | 1/2004 | Byman-Kivivuori et al. |
| 2004/0006606 A1 | 1/2004 | Marotta et al. |
| 2004/0049576 A1 | 3/2004 | Schweitzer et al. |
| 2004/0061716 A1 | 4/2004 | Cheung et al. |
| 2004/0174395 A1 | 9/2004 | Liu |
| 2004/0198374 A1 | 10/2004 | Bajikar |
| 2004/0203815 A1 | 10/2004 | Shoemake et al. |
| 2004/0210320 A1 | 10/2004 | Pandya |
| 2004/0260630 A1 | 12/2004 | Benco et al. |
| 2005/0028208 A1 | 2/2005 | Ellis et al. |
| 2005/0071319 A1 | 3/2005 | Kelley et al. |
| 2005/0083975 A1 | 4/2005 | Macri |
| 2005/0105632 A1 | 5/2005 | Catreux-Erces et al. |
| 2005/0135235 A1 | 6/2005 | Maruyama et al. |
| 2005/0177715 A1 | 8/2005 | Somin et al. |
| 2005/0198238 A1 | 9/2005 | Sim et al. |
| 2005/0221844 A1 | 10/2005 | Trethewey et al. |
| 2005/0223226 A1 | 10/2005 | Sundararajan |
| 2005/0249266 A1 | 11/2005 | Brown et al. |
| 2006/0015904 A1 | 1/2006 | Marcus |
| 2006/0041916 A1 | 2/2006 | Mcquaide |
| 2006/0059462 A1 | 3/2006 | Yamamoto |
| 2006/0107036 A1 | 5/2006 | Randle et al. |
| 2006/0143027 A1 | 6/2006 | Jagannathan et al. |
| 2006/0145815 A1 | 7/2006 | Lanzieri et al. |
| 2006/0171304 A1* | 8/2006 | Hill et al. ............... 370/228 |
| 2006/0239208 A1 | 10/2006 | Roberts et al. |
| 2006/0290519 A1 | 12/2006 | Boate et al. |
| 2006/0294112 A1 | 12/2006 | Mandato et al. |
| 2007/0054616 A1 | 3/2007 | Culbert |
| 2007/0057793 A1 | 3/2007 | Alden |
| 2007/0064604 A1 | 3/2007 | Chen et al. |
| 2007/0124485 A1 | 5/2007 | Frost et al. |
| 2007/0153695 A1 | 7/2007 | Gholmieh et al. |
| 2007/0153729 A1 | 7/2007 | Alapuranen |
| 2007/0161411 A1 | 7/2007 | Liao et al. |
| 2007/0171915 A1 | 7/2007 | Toyama et al. |
| 2007/0192735 A1 | 8/2007 | Lehto et al. |
| 2007/0207750 A1 | 9/2007 | Brown et al. |
| 2007/0223398 A1* | 9/2007 | Luo et al. ............... 370/254 |
| 2007/0225831 A1 | 9/2007 | Sakurada |
| 2007/0248179 A1 | 10/2007 | Hassan et al. |
| 2007/0254628 A1 | 11/2007 | Rybak |
| 2007/0271525 A1 | 11/2007 | Han et al. |
| 2007/0274488 A1 | 11/2007 | Callaghan |
| 2007/0280332 A1 | 12/2007 | Srikanteswara et al. |
| 2007/0280481 A1 | 12/2007 | Eastlake |
| 2008/0002658 A1 | 1/2008 | Soliman |
| 2008/0016338 A1 | 1/2008 | Sun |
| 2008/0055399 A1 | 3/2008 | Woodworth et al. |
| 2008/0055423 A1 | 3/2008 | Ying et al. |
| 2008/0063204 A1 | 3/2008 | Braskich et al. |
| 2008/0065238 A1 | 3/2008 | Igoe |
| 2008/0081597 A1 | 4/2008 | Cole |
| 2008/0104170 A1 | 5/2008 | Ananthanarayanan |
| 2008/0130519 A1 | 6/2008 | Bahl et al. |
| 2008/0130639 A1 | 6/2008 | Costa-Requena et al. |
| 2008/0132201 A1 | 6/2008 | Karlberg |
| 2008/0152098 A1 | 6/2008 | Paryzek et al. |
| 2008/0197802 A1 | 8/2008 | Onishi et al. |
| 2008/0207119 A1 | 8/2008 | Chang |
| 2008/0207128 A1 | 8/2008 | Mikko |
| 2008/0227384 A1 | 9/2008 | Placzek et al. |
| 2008/0252419 A1 | 10/2008 | Batchelor et al. |
| 2008/0275993 A1 | 11/2008 | Mohammed et al. |
| 2008/0293375 A1 | 11/2008 | Swanburg |
| 2008/0293419 A1 | 11/2008 | Somasundaram et al. |
| 2008/0311952 A1 | 12/2008 | Sugiyama |
| 2008/0319857 A1 | 12/2008 | Dobbins et al. |
| 2009/0011738 A1 | 1/2009 | Sasakura |
| 2009/0013175 A1 | 1/2009 | Elliott |
| 2009/0039828 A1 | 2/2009 | Jakubowski |
| 2009/0045913 A1 | 2/2009 | Nelson et al. |
| 2009/0055266 A1 | 2/2009 | Brody et al. |
| 2009/0089885 A1 | 4/2009 | Noble et al. |
| 2009/0100080 A1 | 4/2009 | Toms et al. |
| 2009/0103481 A1 | 4/2009 | Mahajan |
| 2009/0106542 A1 | 4/2009 | Dubs et al. |
| 2009/0111378 A1 | 4/2009 | Sheynman et al. |
| 2009/0138715 A1 | 5/2009 | Xiao et al. |
| 2009/0144622 A1 | 6/2009 | Evans et al. |
| 2009/0154343 A1* | 6/2009 | Fitch et al. ............... 370/221 |
| 2009/0158394 A1 | 6/2009 | Oh et al. |
| 2009/0170431 A1 | 7/2009 | Pering et al. |
| 2009/0196180 A1 | 8/2009 | Bahl et al. |
| 2009/0210940 A1 | 8/2009 | Dean |
| 2009/0303902 A1* | 12/2009 | Liu et al. ............... 370/254 |
| 2009/0319663 A1 | 12/2009 | Giles et al. |
| 2010/0049971 A1 | 2/2010 | Oh |
| 2010/0056124 A1 | 3/2010 | Keating et al. |
| 2010/0081473 A1 | 4/2010 | Chatterjee et al. |
| 2010/0091965 A1 | 4/2010 | Ma et al. |
| 2010/0100637 A1 | 4/2010 | Bowra et al. |
| 2010/0103850 A1* | 4/2010 | Gossain et al. ............... 370/312 |

(56) References Cited

U.S. PATENT DOCUMENTS

| | | | |
|---|---|---|---|
| 2010/0104078 A1 | 4/2010 | Henry, Jr. et al. | |
| 2010/0110890 A1 | 5/2010 | Rainer et al. | |
| 2010/0111033 A1 | 5/2010 | Erceg et al. | |
| 2010/0115278 A1 | 5/2010 | Shen | |
| 2010/0121744 A1 | 5/2010 | Belz et al. | |
| 2010/0144274 A1 | 6/2010 | Mcdowall et al. | |
| 2010/0153762 A1 | 6/2010 | Radulescu et al. | |
| 2010/0157167 A1 | 6/2010 | Lawther et al. | |
| 2010/0175101 A1 | 7/2010 | Devictor et al. | |
| 2010/0186066 A1 | 7/2010 | Pollard | |
| 2010/0191576 A1 | 7/2010 | Raleigh | |
| 2010/0191847 A1 | 7/2010 | Raleigh | |
| 2010/0195580 A1 | 8/2010 | Samarasooriya et al. | |
| 2010/0198952 A1 | 8/2010 | Kneckt et al. | |
| 2010/0220856 A1 | 9/2010 | Kruys | |
| 2010/0226253 A1 | 9/2010 | Bugenhagen | |
| 2010/0232332 A1* | 9/2010 | Abdel-Kader | 370/311 |
| 2010/0257251 A1 | 10/2010 | Mooring et al. | |
| 2010/0284316 A1* | 11/2010 | Sampathkumar | 370/311 |
| 2010/0302005 A1 | 12/2010 | Popovski | |
| 2010/0333032 A1 | 12/2010 | Lau et al. | |
| 2011/0107388 A1 | 5/2011 | Lee et al. | |
| 2011/0145581 A1 | 6/2011 | Malhotra et al. | |
| 2011/0149806 A1 | 6/2011 | Verma et al. | |
| 2011/0176463 A1* | 7/2011 | Cowan et al. | 370/311 |
| 2011/0188419 A1 | 8/2011 | Filoso et al. | |
| 2011/0188420 A1* | 8/2011 | Filoso et al. | 370/311 |
| 2011/0202189 A1 | 8/2011 | Venkatakrishnan et al. | |
| 2011/0230209 A1 | 9/2011 | Kilian | |
| 2011/0238498 A1 | 9/2011 | Hassan et al. | |
| 2011/0261001 A1 | 10/2011 | Liu | |
| 2011/0274020 A1* | 11/2011 | Filoso et al. | 370/311 |
| 2011/0275316 A1 | 11/2011 | Suumaeki et al. | |
| 2011/0280413 A1 | 11/2011 | Wu et al. | |
| 2011/0293095 A1 | 12/2011 | Ben Ayed | |
| 2011/0320963 A1 | 12/2011 | Wong | |
| 2011/0321126 A1 | 12/2011 | Maniatopoulos | |
| 2012/0101952 A1 | 4/2012 | Raleigh et al. | |
| 2012/0139690 A1 | 6/2012 | Gupta et al. | |
| 2012/0144083 A1 | 6/2012 | Hassan et al. | |
| 2012/0147268 A1 | 6/2012 | Hassan et al. | |
| 2012/0147274 A1 | 6/2012 | Hassan et al. | |
| 2012/0147825 A1 | 6/2012 | Hassan et al. | |
| 2012/0155643 A1 | 6/2012 | Hassan et al. | |
| 2012/0157038 A1 | 6/2012 | Menezes et al. | |
| 2012/0158839 A1 | 6/2012 | Hassan et al. | |
| 2012/0158947 A1 | 6/2012 | Hassan et al. | |
| 2012/0178429 A1* | 7/2012 | Camps Mur et al. | 455/418 |
| 2012/0197792 A1 | 8/2012 | Raleigh | |
| 2013/0033800 A1 | 2/2013 | Bartnik et al. | |
| 2013/0097422 A1 | 4/2013 | Salomone | |
| 2013/0182614 A1 | 7/2013 | Kumar et al. | |
| 2013/0322846 A1 | 12/2013 | Ferren et al. | |

FOREIGN PATENT DOCUMENTS

| | | |
|---|---|---|
| CN | 1607780 A | 4/2005 |
| CN | 1677975 A | 10/2005 |
| CN | 1929424 A | 3/2007 |
| CN | 1960474 A | 5/2007 |
| CN | 101021774 A | 8/2007 |
| CN | 101044718 A | 9/2007 |
| CN | 101075820 A | 11/2007 |
| CN | 101094140 A | 12/2007 |
| CN | 101137960 A | 3/2008 |
| CN | 101147308 A | 3/2008 |
| CN | 101179359 A | 5/2008 |
| CN | 101288063 A | 10/2008 |
| CN | 101657828 A | 2/2010 |
| CN | 1662920 B | 4/2010 |
| CN | 101841637 A | 9/2010 |
| CN | 101867623 A | 10/2010 |
| EP | 2256663 A | 12/2010 |
| GB | 2418809 A | 4/2006 |
| JP | 2001160927 A | 6/2001 |
| JP | 2005004089 A | 1/2005 |
| JP | 2005295286 A | 10/2005 |
| JP | 2005341094 A | 12/2005 |
| JP | 2006050216 A | 2/2006 |
| KR | 2008032979 A | 4/2008 |
| KR | 20100038089 A | 4/2010 |
| WO | 0147248 A | 6/2001 |
| WO | 0154342 A | 7/2001 |
| WO | 2004003801 A1 | 1/2004 |
| WO | 2008021855 A | 2/2008 |
| WO | 2008089854 A | 7/2008 |
| WO | 2008127507 A | 10/2008 |
| WO | 2009046869 A | 4/2009 |
| WO | 2010044599 A | 4/2010 |
| WO | 2010132296 A1 | 11/2010 |

OTHER PUBLICATIONS

Symbian Foundation Peer-to-Peer WiFi Inititative (WiFi Direct)—Published Date: Sep. 10, 2010 http://developer.symbian.org/wiki/index.php/Symbian_Foundation_Peer-to-Peer WiFi_inititative_%28WiFi_Direct%29.

802.11 Fast BSS Transition (FT) Part 1 of 2—Published Date: Aug. 21, 2007 http://www.cwnp.com/index/cwnp_wifi_blog/5023.

Guide to IEEE 802.11i: Establishing Robust Security Networks—Published Date: Jun. 2006 http://www.Ieetupload.com/database/Misc/Papers/WIRELESS/SHELF/ieee802.11i.pdf.

CRTDH—An Efficient Key Agreement Scheme for Secure Group Communications in Wireless Ad Hoc Networks—Published Date: 2005 http://citeseerx.ist.psu.edu/viewdoc/download?doi=10.1.1.1112.8&rep=rep1&type=pdf.

Wi-Fi Certified Wi-Fi Direct Personal Portable Wi-Fi Technology, Oct. 2010 pp. 1-14.

Manifest Permission; Published Date: Jul. 21, 2004; 19 pages; http://developer.android.com/reference/android/Manifest.permission.html.

Shih, Eugene et al.; Wake on Wireless: An Event Driven Energy Saving; Published Date: Sep. 23-26, 2002; 12 pages; http://www.sigmobile.org/mobicom/2002/papers/p053-shih.pdf.

Sridhar, T.; Wi-Fi, Bluetooth and WiMAX; The Internet Protocol Journal, vol. 11, No. 4; Retrieved Date: Sep. 30, 2010; http://www.cisco.com/web/about/ac123/ac147/archived_issues/ipj_11-4/114_wifi.html.

Non-Final Office Action mailed May 30, 2013 in U.S. Appl. No. 12/970,034, 22 pages.

"International Search Report", Mailed Date: Aug. 14, 2012, Application No. PCT/US2011/065276, Filed Date: Dec. 15, 2011, pp. 9.

"International Search Report", Mailed Date: Jun. 12, 2012, Application No. PCT/US2011/063207, Filed Date: Dec. 4, 2011, pp. 9.

"International Search Report", Mailed Date: Jun. 22, 2012, Application No. PCT/US2011/063340, Filed Date: Dec. 5, 2011, pp. 9.

"Omnidrive", 2006, retrieved Oct. 26, 2006, 2 pages.

"Xdrive", 2006, retrieved Oct. 26, 2006, 2 pages.

02 Network Scraps Unlimited Data for Smartphones; Published Date: Jun. 10, 2010; 2 pages.

802.11 Fast BSS Transition (FT) Part 1 of 2; Published Date: Aug. 21, 2007, 5 pages.

A New Location Technique for the Active Office—Published Date: 1997, http://citeseerx.ist.nsu.edu/viewdoc/download?doi=10.1.1.20.5052&rep=rep1&type=pdf.

Advisory Action mailed Jan. 2, 2013 in U.S. Appl. No. 11/726,862, 3 pages.

Cisco Systems, Inc., "802.11 n Wireless Technology Overview," 2007, 7 pages.

Creating Customized Web Experiences with Windows Media Player 9 Series; Published Date: Nov. 2002; 1 page.

CRTDH; An Efficient Key Agreement Scheme for Secure Group Communications in Wireless Ad Hoc Networks; Published Date: 2005, 5 pages.

Final Office Action mailed Nov. 13, 2012 in U.S. Appl No. 12/748,829, 42 pages.

Final Office Action mailed Nov. 15, 2010 in U.S. Appl. No. 11/726,862, 21 pages.

(56) References Cited

OTHER PUBLICATIONS

Final Office Action mailed Feb. 15, 2013 in U.S. Appl. No. 12/967,761, 28 pages.
Final Office Action mailed Mar. 28, 2013 in U.S. Appl. No. 12/967,638, 22 pages.
Final Office Action mailed Sep. 15, 2011 in U.S. Patent Application No. 11/726,862, 24 pages.
Final Office Action mailed Sep. 20, 2012 in U.S. Appl. No. 11/726,862, 35 pages.
Guide to IEEE 802.11i: Establishing Robust Security Networks;Published Date: Jun. 2006; 155 pages.
How Do You Use a Laptop As a TV Remote Control?; Published Date: Jul. 15, 2008; 6 pages.
International Search Report mailed Jul. 24, 2012 in PCT Application No. PCT/US2011/065691, Filing Date: Dec. 17, 2011, 11 pages.
International Search Report mailed Sep. 5, 2012 in PCT Application No. PCT/US2011/065692, Filing Date: Dec. 17, 2011, 8 pages.
International Search Report; Mailed Date: Aug. 31, 2012; Application No. PCT/US2011/064753; Filed Date: Dec. 14,2011, pp. 8.
International Search Report; Mailed Date: Jul. 31, 2012; Application No. PCT/US2011/065285; Filed Date: Dec. 15,2011, pp. 9.
Manage Subscription Products & Automate Recurring Billing Operations; Copyright 2008-2009; Retrieved Date: Jan. 12, 2010, 1 page.
Meinrath et al.; "Unlicensed 'White Space Device' Operations on the TV Band and the Myth of Harmful Interferences", Mar. 2008, 13 pages.
Menezes, Pascal; "Operating System Supporting Cost Aware Applications"; U.S. Appl. No. 13/844,932, Filed Mar. 16, 2013; 57 pages.
MIST: Cellular Data Network Measurement for Mobile Applications; Published Date: Apr. 24, 2006; 9 pages.
Mobile Internet Usage Measurements—Case Finland; Published Date: Apr. 24, 2006; 140 pages.
Mohammed, "Web Service for User and Subscription Data Storage", U.S. Appl. No. 13/772,275, Filed Feb. 20. 2013, 49 pages.
Motorola, "TV White Space Position Paper," 2008, 10 pages.
Non-Final Office Action mailed Jan. 4, 2013 in U.S. Appl. No. 12/960,730, 14 pages.
Non-Final Office Action mailed Oct. 10, 2012 in U.S. Appl. No. 12/967,638, 33 pages.
Non-Final Office Action mailed Oct. 26, 2012 in U.S. Appl. No. 12/967,761, 24 pages.
Non-Final Office Action mailed Apr. 11, 2013 in U.S. Appl. No. 12/972,104, 15 pages.
Non-Final Office Action mailed Apr. 14, 2011 in U.S. Appl. No. 11/726,862, 22 pages.
Non-Final Office Action mailed Apr. 5, 2012 in U.S. Appl. No. 11/726,862, 23 pages.
Non-Final Office Action mailed Jun. 23, 2010 in U.S. Appl. No. 11/726,862, 16 pages.
Non-Final Office Action mailed Aug. 9, 2012 in U.S. Appl. No. 12/748,829, 29 pages.
Non-Final Office Action mailed Sep. 24, 2012 in U.S. Appl. No. 12/964,492, 10 pages.
Non-Final Office Action mailed Sep. 6, 2012 in U.S. Appl. No. 12/972,230, 10 pages.
Notice of Allowance mailed Nov. 11, 2012 in U.S. Appl. No. 12/972,230, 9 pages.
Notice of Allowance mailed Mar. 20, 2013 in U.S. Appl. No. 12/964,492, 9 pages.
Notice of Allowance mailed Mar. 25, 2013 in U.S. Appl. No. 12/972,230, 8 pages.
Notice of Allowance mailed Mar. 4, 2013 in U.S. Appl. No. 12/972,230, 7 pages.
Shared Spectrum, Inc., "Our Technology," Nov. 2010, 2 pages.
Subscription Management; Copyright 2009; Retrieved Date: Jan. 12, 2010; 2 pages.
T-mobile "Unlimited" Data Usage; Published Date: Mar. 9, 2010; 6 pages.
Torres Service Management Platform; Retrieved Date: Jan. 12, 2010; 2 pages.
VAS Subscription Manager; Retrieved Date: Jan. 12, 2010; 1 page.
Notice of Allowance mailed Jul. 12, 2013 in U.S. Appl. No. 12/967,761, 12 pages.
Wi-Fi Alliance: FAQs; Published Date: 2010; 19 pages.
WinLIRC; Published Date: Mar. 17, 2008; 5 pages.
Wireless PC to TV; Retrieved Date: Sep. 9, 2010; 2 pages.
Wood, "Kowari: A Platform for Semantic Web Storage and Analysis", May 27, 2005, 16 pages.
Yuan, Y. et al., "Allocating Dynamic Time-Spectrum Blocks in Cognitive Radio Networks," Sep. 9-14, 2007, 10 pages.
Final Office Action mailed Sep. 23, 2013 in U.S. Appl. No. 12/970,034, 22 pages.
Final Office Action mailed Oct. 25, 2013 in U.S. Appl. No. 12/972,104, 10 pages.
Non-Final Office Action mailed Nov. 8, 2013 in U.S. Appl. No. 131844,932, 6 pages.
Final Office Action mailed Dec. 26, 2013 in U.S. Appl. No. 12/967,638, 34 pages.
Non-Final Office Action mailed Aug. 14, 2013 in U.S. Appl. No. 12/967,638, 30 pages.
Chinese Office Action mailed Nov. 20, 2013 in CN Patent App. No. 201110423001.3, 18 pages including translation.
Chinese Office Action mailed Dec. 4, 2013 in CN Patent App. No. 201110423031.4, 26 pages including translation.
Non-Final Office Action mailed Nov. 6, 2013 in U.S. Appl. No. 12/960,730, 16 pages.
Butler, Kevin R.B. et al.; Leveraging Identity-Based Cryptography for Node ID Assignment in Structured P2P Systems; IEEE Transactions on Parallel and Distributed Systems; Vol. 20, No. 12; Dec. 2009; pp. 1803-1815.
Chinese Office Action mailed Jan. 6, 2014 in CN Patent App. No. 2011104230687, 8 pages including concise explanation of relevance and partial translation.
Chinese Office Action mailed Dec. 4, 2013 in CN Patent App. No. 201110408217.2, 12 pages, including Concise Explanation of Relevance and/or partial translation.
Chinese Office Action mailed Feb. 17, 2014 in CN Patent App. No. 201110400433.2, 12 pages including partial translation.
Chinese Office Action mailed Feb. 27, 2014 in CN Patent App. No. 201110400472.2, 13 pages including Concise Explanation of Relevance and partial translation.
Non-Final Office Action mailed Feb. 28, 2014 in U.S. Appl. No. 12/970,159, 22 pages.
Notice of Allowance mailed Mar. 6, 2014 in U.S. Appl. No. 12/967,638, 11 pages.
Notice of Allowance mailed Apr. 2, 2014 in U.S. Appl. No. 12/964,492, 9 pages.
Office Action dated Apr. 1, 2014 in CN Pat. App. No. 201110423001.3, 8 pages, including partial translation.
Araujo, Joao Taveira et al., "Towards Cost-Aware Multipath Routing," AIMS 2009, LNCS 5637, 2009, pp. 207-210.
Haas, Robert et al., "Cost-and Quality-of-Service-Aware Network-Service Deployment," 2001, 6 pages.
Lun, Desmond S. et al., "Network Coding with a Cost Criterion," MIT LIDS Technical Report P-2584, Apr. 2004, 18 pages.
Non-Final Office Action mailed Aug. 5, 2014 in U.S. Appl. No. 13/844,932, 7 pages.
Notice of Allowance mailed Jul. 24, 2014 in U.S. Appl. No. 12/972,230, 7 pages.
Pawar, Pravin et al. "Towards Location based QoS-Aware Network Selection Mechanism for the Nomadic Mobile Services," Dec. 5, 2009, 5 pages.
Notice of Allowance mailed Sep. 3, 2014 in U.S. Appl. No. 12/970,159, 9 pages.
Notice of Allowance mailed Sep. 17, 2014 in U.S. Appl. No. 12/972,230, 7 pages.
Chinese Office Action mailed Aug. 5, 2014 in CN Patent App. No. 201110426179.3, 6 pages, including partial translation.
Chinese Office Action mailed Sep. 2, 2013 in CN Patent App. No. 201110408217.2, 6 pages, including partial translation.

(56) References Cited

OTHER PUBLICATIONS

Chinese Office Action mailed Sep. 4, 2014 in CN Patent App. No. 201110423001.3, 6 pages, including partial translation.
Chinese Office Action mailed Sep. 2, 2014 in CN Patent App. No. 201110408217.2, 6 pages, including partial translation.
Final Office Action mailed Oct. 6, 2014 in U.S. Appl. No. 12/972,104, 10 pages.
Hassan, Amer; "Cognitive Use of Multiple Regulatory Domains"; U.S. Appl. No. 14/458,203, filed Aug. 12, 2014; 58 pages including Preliminary Amendment filed Oct. 9, 2014.
Hassan, Amer; "Direct Connection With Side Channel Control"; U.S. Appl. No. 14/333,386, filed Jul. 16, 2014; 65 pages including Preliminary Amendment filed Sep. 26, 2014.
Non-Final Office Action mailed Oct. 27, 2014 in U.S. Appl. No. 13/772,275, 14 pages.
"Office Action and Search Report Issued in Chinese Patent Application No. 201110400472.2", Mailed Date: Oct. 27, 2014, 14 pages.
Notice of Allowance mailed Nov. 12, 2014 in U.S. Appl. No. 13/844,932, 8 pages.
"Second Office Action Issued in Chinese Patent Application No. 201110408217.2", Mailed Date: May 23, 2014, Filed Date: Dec. 09, 2011, 8 Pages including partial translation.
Non-Final Office Action mailed Jun. 18, 2014 in U.S. Appl. No. 12/960,753, 12 pages.
Texas Instruments, MSP430 Ultra-Low-Power MCUs and TI-RFid Devices, 2 pages, 2009.
Notice of Allowance mailed Aug. 20, 2014 in U.S. Appl. No. 12/964,492, 13 pages.
Non-Final Office Action mailed Oct. 2, 2014 in U.S. Appl. No. 14/318,380, 5 pages.
Chinese Office Action dispatched Dec. 4, 2013 in CN Patent Application No. 2011104261878, 8 pages including Concise Explanation of Relevance and/or partial translation.
Chinese Office Action dispatched Feb. 28, 2014 in CN Patent Application No. 2011104261793, 9 pages including Concise Explanation of Relevance and/or partial translation.
Chinese Office Action mailed Jul. 11, 2014 in CN Patent App. No. 201110423031.4, 13 pages including partial translation and/or concise explanation of relevance.
Extended European Search Report dated May 20, 2014 in EP Patent App. No. 11847426.1, 8 pages.
Menezes, Pascal; "Operating System Supporting Cost Aware Applications"; U.S. Appl. No. 14/318,380, filed Mar. 16, 2013; 56 pages.
Non-Final Office Action mailed Jun. 20, 2014 in U.S. Appl. No. 12/972,104, 10 pages.
Non-Final Office Action mailed Jul. 18, 2014 in U.S. Appl. No. 12/970,034, 24 pages.
Notice of Allowance mailed Dec. 26, 2013 in U.S. Appl. No. 12/972,230, 8 pages.
Notice of Allowance mailed Feb. 19, 2014 in U.S. Appl. No. 13/844,932, 8 pages.
Notice of Allowance mailed Mar. 10, 2014 in U.S. Appl. No. 12/972,230, 8 pages.
Notice of Allowance mailed May 7, 2014 in U.S. Appl. No. 13/844,932, 7 pages.
Notice of Allowance mailed Jun. 27, 2014 in U.S. Appl. No. 12/970,159, 8 pages.
Office Action dated Jun. 5, 2014 in CN Pat. App. No. 201110417226.8, 14 pages, including partial translation and/or concise explanation of relevance.
Meinrath et al.; ""White Space Devices" & The Myths of Harmful Interference", 11 N.Y.U.J. Legis&Pub. Policy 495, 2008, 24 pages.
Non-Final Office Action mailed May 23, 2014 in U.S. Appl. No. 12/748,829, 30 pages.
Non-Final Office Action mailed May 23, 2014 in U.S. Appl. No. 12/960,730, 18 pages.
Office Action dated Apr. 3, 2014 in CN Pat. App. No. 201110417153.2, 15 pages, including partial translation and/or concise explanation of relevance.

Chinese Office Action mailed Sep. 9, 2014 in CN Patent App. No. 201110400433.2, 13 pages including partial translation.
Non-Final Office Action mailed Sep. 29, 2014 in U.S. Appl. No. 12/748,829, 30 pages.
Chinese Office Action mailed Jan. 7, 2015 in CN Patent App. No. 201110400433.2, 10 pages including partial translation.
Office Action dated Dec. 15, 2014 in CN Pat. App. No. 201110417153.2, 8 pages, including partial translation.
Final Office Action mailed Jan. 28, 2015 in U.S. Appl. No. 12/970,034, 24 pages.
Final Office Action mailed Dec. 4, 2014 in U.S. Appl. No. 12/960,730, 22 pages.
Final Office Action mailed Jan. 9, 2015 in U.S. Appl. No. 14/318,380, 8 pages.
Final Office Action mailed Jan. 16, 2015 in U.S. Appl. No. 12/960,753, 12 pages.
Office Action dated Feb. 3, 2015 in CN Pat. App. No. 201110417226.8, 7 pages, including partial translation and/or concise explanation of relevance.
Choi, Jongmyung., "RFID Context-aware Systems", In Proceedings of Sustainable Radio Frequency Identification Solutions, Feb. 1, 2010, pp. 307-331.
Currie, et al., "Experimental Evaluation of Read Performance for RFID-based Mobile Sensor Data Gathering Applications", In Proceedings of the 7th International Conference on Mobile and Ubiquitous Multimedia, Dec. 3, 2008, pp. 92-95.
Kaasinen, et al., "Ambient Functionality—Use Cases", In Proceedings of the 2005 joint conference on Smart objects and ambient intelligence: innovative context-aware services: usages and technologies, Oct. 12, 2005, 6 pages.
Kitson, Fred., "Mobile Media Making it a Reality", In Proceedings of Mobile Computing, vol. 3, Issue 4, Jun. 7, 2005, 17 pages.
Klym, et al., "The Evolution of RFID Networks: The Potential for Disruptive Innovation", In White Paper, Mar. 2006, 20 pages.
Roduner, et al., "Operating Appliances with Mobile Phones—Strengths and Limits of a Universal Interaction Device", In Proceedings of the 5th international conference on Pervasive computing, May 13, 2007, 18 pages.
Non-Final Office Action mailed Mar. 31, 2015 in U.S. Appl. No. 14/318,380, 7 pages.
Non-Final Office Action mailed Apr. 23, 2015 in U.S. Appl. No. 14/458,203, 10 pages.
Office Action dated Apr. 13, 2015 in CN Pat. App. No. 201110400472.04, 14 pages, including partial translation and/or concise explanation of relevance.
Hassan, Amer; "Secure Protocol for Peer-To-Peer Network"; U.S. Appl. No. 14/600,477, filed Jan. 20, 2015; 62 pages including Preliminary Amendment filed May 8, 2014.
Non-Final Office Action mailed Jun. 10, 2015 in U.S. Appl. No. 12/972,104, 10 pages.
Notice of Allowance mailed Jun. 8, 2015 in U.S. Appl. No. 13/772,275, 8 pages.
Notice of Allowance mailed Jun. 24, 2015 in U.S. Appl. No. 14/458,203, 11 pages.
Non-Final Office Action mailed Jun. 30, 2015 in U.S. Appl. No. 12/970,034, 26 pages.
Final Office Action mailed Jul. 13, 2015 in U.S. Appl. No. 14/318,380, 8 pages.
Extended European Search Report dated Jun. 8, 2015 in EP Patent App. No. 11849551.4, 6 pages.
Chinese Office Action mailed Jul. 13, 2015 in CN Patent App. No. 201110400433.2, 3 pages.
"Office Action Received in Australia Patent Application No. 2011343700", Mailed Date: Jul. 24, 2015, 2 Pages.
Non-Final Office Action mailed Aug. 14, 2015 in U.S. Appl. No. 12/960,753, 16 pages.
Office Action dated Aug. 14, 2015 in CN Pat. App. No. 201110417226.8, 6 pages, including partial translation.

(56) References Cited

OTHER PUBLICATIONS

Non-Final Office Action mailed Sep. 4, 2015 in U.S. Appl. No. 14/318,380, 6 pages.
Notice of Allowance mailed Oct. 28, 2015 in U.S. Appl. No. 14/333,386, 12 pages.
Notice of Acceptance dated Oct. 16, 2015 in AU Pat. App. No. 2011343943, 2 pages.
Office Action dated Aug. 13, 2015 in AU Pat. App. No. 2011343943, 5 pages.
Hassan, Amer; "Cognitive Use of Multiple Regulatory Domains"; U.S. Appl. No. 14/863,290, filed Sep. 23, 2015; 57 pages including Preliminary Amendment filed Nov. 1, 2015.
Notice of Allowance mailed Oct. 19, 2015 in U.S. Appl. No. 13/772,275, 8 pages.
Office Action dated Aug. 28, 2015 in JP Pat. App. No. 2013-544714, 5 pages including translation.
Desai, Mitesh, K; "Fast Join of Peer to Peer Group With Power Saving Mode"; U.S. Appl. No. 14/975,818, filed Dec. 20, 2015; 56 pages including Preliminary Amendment filed Dec. 29, 2015.

* cited by examiner

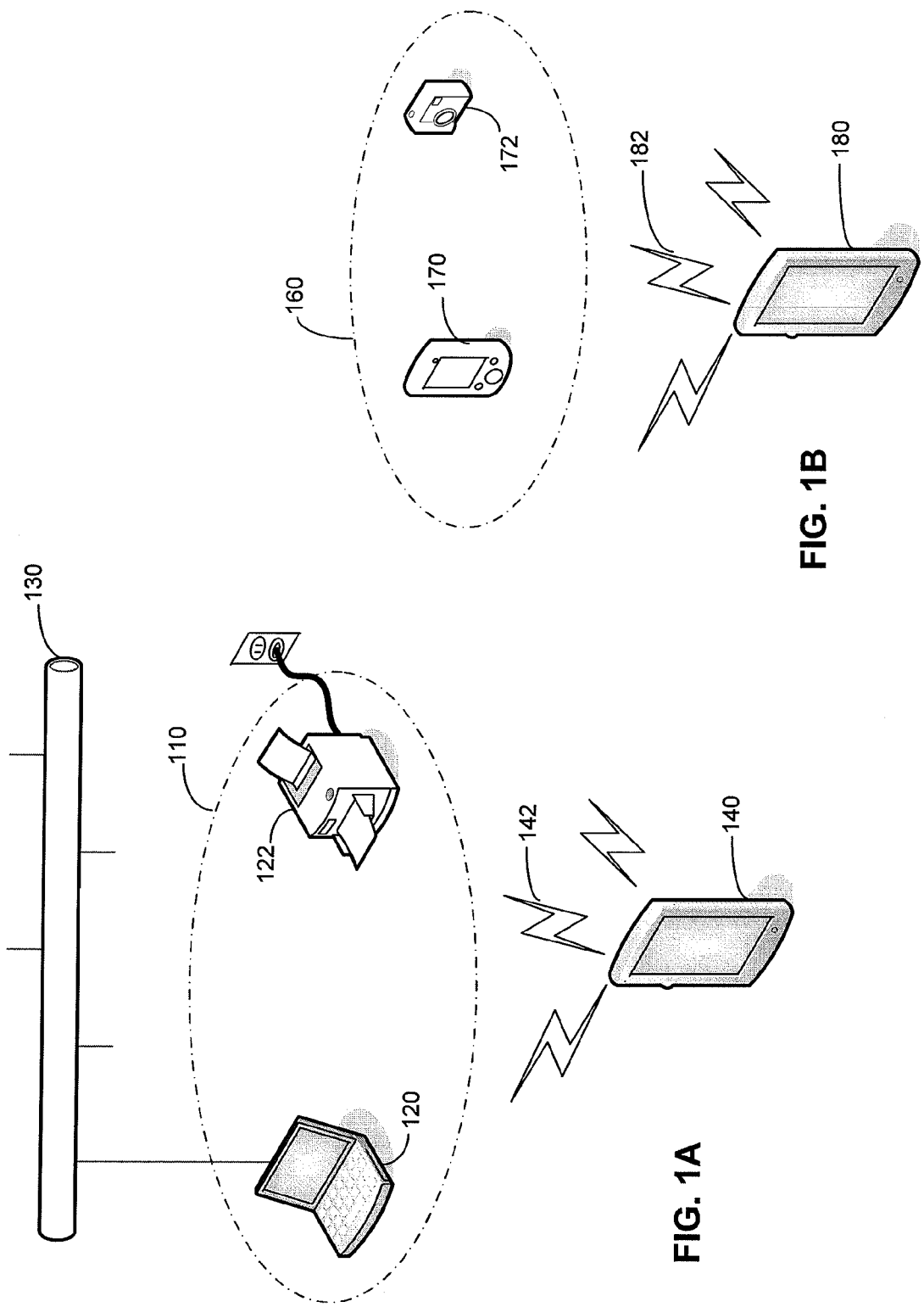

FAST JOIN OF PEER TO PEER GROUP WITH POWER SAVING MODE

BACKGROUND

Many computers today have radios to support wireless communication. Wireless communication is used, for example, to connect to an access point of a network. By associating with the access point, a wireless computer can access devices on the network or to other networks reachable through that network, such as the Internet. As a result, the wireless computer can exchange data with many other devices, enabling many useful functions.

To enable computers to be configured for association with an access point, it is common for the access points to operate according to a standard. A common standard for devices that connect to access points is called WI-FI. This standard was promulgated by the WI-FI Alliance, and is widely used in portable computers. There are multiple versions of this standard, but any of them can be used to support connections through access points.

Wireless communications may also be used to form connections directly to other devices without using an access point. These connections are sometimes called "peer-to-peer" connections and may be used, for example, to allow a computer to connect to a mouse or keyboard wirelessly. More generally, peer-to-peer connections may be used to establish a group of devices of any type that may communicate without requiring an infrastructure. Wireless communications for these direct connections also have been standardized. A common standard for such wireless communications is called BLUETOOTH®.

In some instances, a wireless computer may concurrently connect to other devices through an access point and as part of a group engaging in peer-to-peer communications. To support such concurrent communication, some computers have multiple radios. More recently a standard has been proposed, called WI-FI Direct, that enables both an infrastructure connection and communication as part of a peer-to-peer group with similar wireless communications that can be processed with a single radio. This standard, also published by the WI-FI Alliance, extends the popular WI-FI communications standard for infrastructure-based communications to support direct connections.

Equipping computing devices to support direct connections is expected to expand the scenarios in which a wireless computing device can connect to other wireless devices. For example, computer users working together may more readily form a group that allows the users to share data without requiring any specific infrastructure. Similarly, a computer may more readily connect wirelessly to a printer, camera or devices providing other desired services.

SUMMARY

In a peer-to-peer wireless communication environment, techniques are provided for a device seeking to join a group to, more quickly and using less power, identify a suitable group and then join that group. Such techniques may be useful, for example, when the devices in the group communicate in accordance with a peer-to-peer networking protocol that provides for the group owner to be absent from the group by not responding while in a low power sleep state. The disclosed techniques may involve a device, other than a device controlling the group, responding to a request for information about the group when the controlling device is in the sleep state or otherwise absent.

A device may provide information that can be used by the joining device to synchronize with the controlling device such that the joining device is tuned to a channel used by the controlling device at a time when the controlling device is in an awake state. Such information may include an indication of the channels used by the controlling device. Alternatively or additionally, the information may reveal a scheduled awake time for the controlling device or other information useful in synchronizing with the device controlling the group. Though, as a further alternative, the information may reveal types of services available upon joining the group such that the joining device may determine whether to attempt to join the group at all.

The device providing information may be any suitable device that has information about the device controlling the group. The device, for example, may be a device already joined in the group. The information provided may be obtained through communications with the controlling device, including upon pairing with the device or through a subsequently received notice that the controlling device will be absent from the group.

Any suitable mechanism may be used to trigger a device to provide this information. In some embodiments, a device seeking to join a group may broadcast a message requesting information about a device controlling a group. Such a request may be sent by the joining device after it attempts to locate a group but does not detect a device controlling a group or at any other suitable time.

These techniques may be used for finding any suitable peer-to-peer group, using any suitable peer-to-peer networking protocol. As one example, the peer-to-peer networking protocol may be a WI-FI Direct protocol. In such an embodiment, the device controlling the group may be a group owner, in accordance with that protocol. The device seeking to join a group may format a request for information about a group as an information element in a probe request message in accordance with that protocol. Information about the group owner may be included as an information element in a probe response message.

Accordingly, the invention may be embodied in any of a number of suitable forms, including a method of operating a wireless device to request and/or use information about a device controlling a peer-to-peer group, a method of operating a wireless device to generate and/or provide such information, or computer-executable instructions for controlling a device to perform one or more roles to implement such techniques.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIGS. 1A and 1B are sketches of exemplary environments in which embodiments of the invention may operate;

DETAILED DESCRIPTION

Figure 2A:
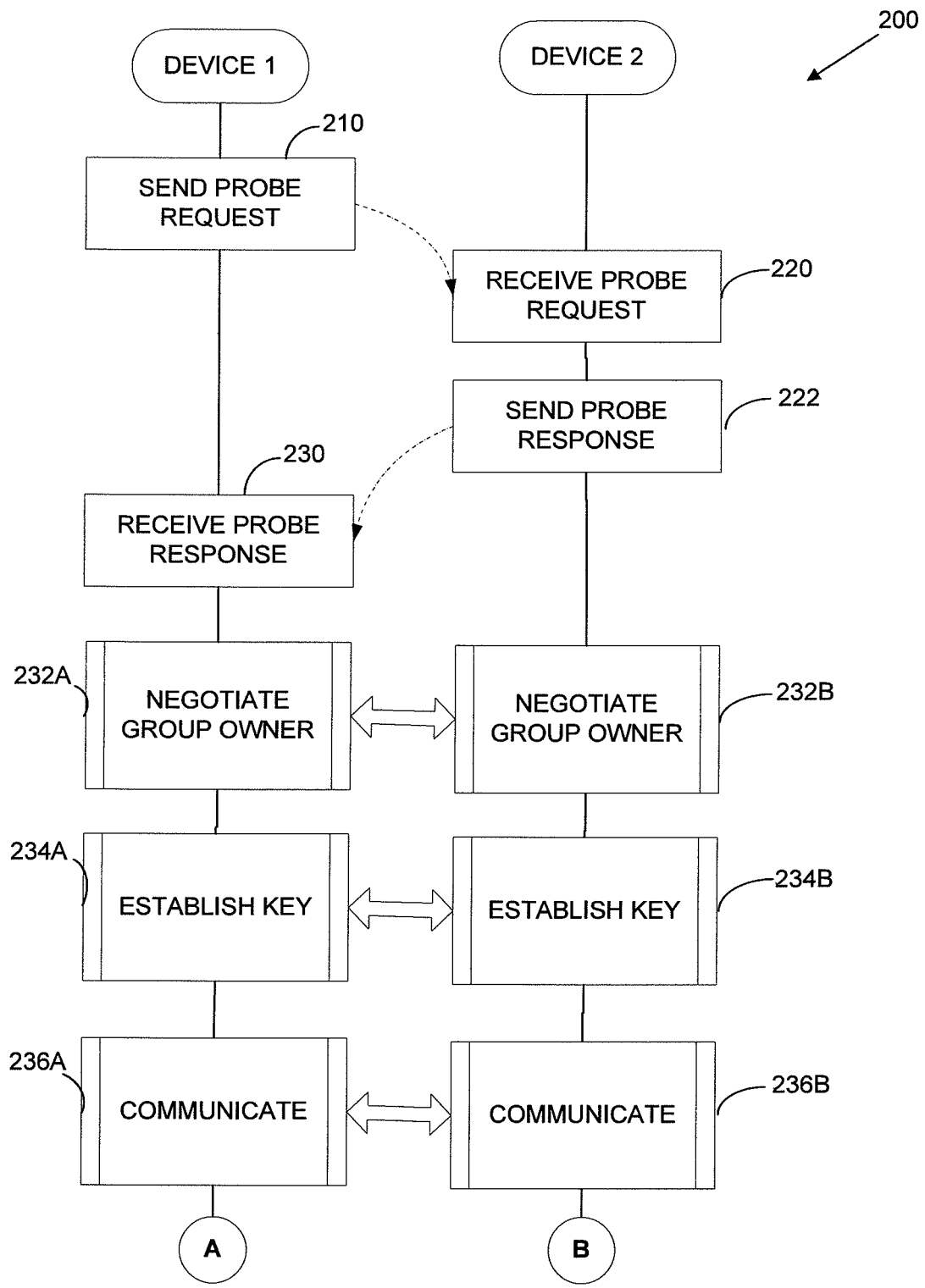
FIGS. 2A and 2B, when connected at the points labeled A and B, form a flow chart of an exemplary method of operation of wireless devices forming a group in accordance with a peer-to-peer protocol.

The inventors have recognized and appreciated that the usefulness of a peer-to-peer connection protocol, such as the WI-FI Direct protocol, can be expanded by using techniques that reduce the time or power required by a device seeking to join an existing group of devices. Further, the inventors have recognized and appreciated that power savings features of those protocols that allow a device controlling a group to temporarily enter a low power state may have an undesired effect of increasing power consumption by a device seeking to join an existing group. In particular, the joining device may have to scan for a controlling device for a relatively long period of time until the joining device is listening on a channel used by the controlling device at a time when the controlling device is actively transmitting.

To reduce the amount of time a device spends actively scanning for a group controlling device, if the joining device does not detect a group controller for an existing group, the joining device may request other wireless devices to respond with information about the group owner.

Such a request may be made in any suitable way, such as with a management frame formatted in accordance with the direct connection protocol. In some embodiments, such a management frame may be a designed for the purpose of requesting information about an absent group controller. Though, in other embodiments, the management frame may be a standard management frame in accordance with the direct connection protocol, modified to signify a request for information about a group controller. As a specific example, the management frame may be a probe request, modified by insertion of an information element signifying a request for group controller information.

A response to such a request for information may be made by any suitable device that has information about a group controller. In some embodiments, a device that responds to such a request, though not a group controller, may be a wireless device that is joined in a group. Such a device may be aware of the group controller for that group and may have stored information that may be provided in response to a request for information about the group controller.

Any suitable information about the group controller may be provided in response to the request for information. A wireless device that is in the group may share with a requesting device any suitable information it has stored. In some embodiments, the information shared with a requesting device may be based on information that a wireless device that is joined in a group has stored for its own interaction with the group controller.

For example, the provided information may include a channel or channels used by the group controller to broadcast its availability. A requesting device may use this information to monitor a channel used by the group controller in order to receive a management frame, such as a beacon, from the group controller. In this way, the joining device may more quickly discover the group controller, thereby reducing the time and/or power it spends scanning to find a group controller so that it can join the group.

In some embodiments, other information alternatively or additionally may be provided in response to a request. In some embodiments, a power saving schedule for the group controller may be provided. For example, in the WI-FI Direct protocol, a group may be controlled by a group owner, which transmits to other devices that are joined in the group a GROUP OWNER ABSENT message prior to entering a power saving state or will otherwise be unavailable for communication. That message may indicate a time during which the group owner will be absent. A wireless device joined in a group may receive such a GROUP OWNER ABSENT message and track the time until the group owner is again available. This information, indicating when the group owner will next be available, may be shared with a requesting device such that the requesting device may conserve power by delaying an attempt to communicate with the group owner until the group owner is no longer absent from the group.

The response also may include information about the group controller that may reveal to the requesting device whether the group controller provides services sought by the requesting computing device. With this information, the requesting computing device may more effectively determine whether and when to send further probe messages to connect with the group controller.

Though, it is not a requirement that the responding device be already joined in a group with a group controller. Any wireless device capable of receiving messages in accordance with a wireless protocol may receive wireless communications from which it can identify that a group has been formed and may be able to identify a device controlling that group. For example, in the WI-FI Direct protocol, messages constituting a group owner negotiation may be sent, with at least one such message identifying the group owner that is selected as a result of such a negotiation. Any device in the vicinity of the devices forming a group may receive these messages and may therefore have information about the group owner. Alternatively or additionally, a device, though not joined in a group, may receive a GROUP OWNER ABSENT message or other messages from a nearby group owner. Accordingly, the specific device that responds to such a request for information is not critical to the invention.

FIG. 1A illustrates an environment in which embodiments of the invention may be applied. In this example, devices have formed a group 110. The group 110 may be formed in accordance with a peer-to-peer protocol. In the illustrated example, the devices operate according to the WI-FI Direct protocol. Though, it should be appreciated that any suitable peer-to-peer protocol may be used and that other protocols may perform comparable functions using comparable messages, even if named differently.

In this example, two devices are shown joined in group 110, device 120 and device 122. It should be appreciated that two devices are shown for simplicity, but a group may contain any suitable number of devices consistent with the protocol.

In this example, device 120 is illustrated as a laptop computer. Device 122 is illustrated as a printer. These devices may form group 110 to enable a user of device 120 to print documents through device 122. Though, it should be appreciated that the specific function of the devices joined in group 110 is not critical to the invention.

A peer-to-peer protocol may specify that one of the devices in a group perform control functions for that group. As an example, a device may be designated to control admission to the group such that a device seeking to join group 110 must first communicate with the controlling device. Such a controlling device may be designated as a group owner. In the embodiment of FIG. 1A, device 120 may be designated as the group owner. Though, it should be appreciated that a computing device need not be designated as the group owner. In some scenarios, a peripheral device, such as device 122, may serve as a group owner. The specific type of device serving as the group owner may be determined in accordance with the protocol used by group 110 or in any other suitable way.

Regardless of the manner in which the group owner is determined, for a device, such as device 140, to join group 110, the device may communicate with device 120. As a specific example, in accordance with the WI-FI Direct protocol, device 140 may detect a beacon transmitted by device 120, identifying itself as a group owner. In response, device 140 may transmit a join request directed at device 120 as the group owner of group 110. Device 120 may apply criteria to determine whether device 140 may be admitted to group 110. If so, device 120 may exchange wireless messages with device 140, to enable device 140 to interact through device 120 as part of group 110. These interactions may be prescribed in accordance with the peer-to-peer protocol used to form group 110. As a specific example, the interactions may entail the sending and receiving, by each of devices 120 and 140, management frames defined in accordance with the peer-to-peer protocol.

As part of this exchange of messages, wireless device 140 may obtain from device 120 information about the services available through group 110. As an example, device 120 may communicate that group 110 includes a printer to provide printing services. Accordingly, based on the exchange of information with the group owner, device 140 may determine whether group 110 provides a specific type of services sought by device 140.

FIG. 1A illustrates a scenario in which a device 140 may not be able to immediately contact device 120 so as to join group 110 or to obtain information about group 110 to determine whether to join group 110. FIG. 1A illustrates an operating state in which device 120, acting as a group owner, is "absent" from group 110. There may be multiple reasons that a group owner may be absent.

In this example, device 120 is coupled to an enterprise network 130. In its role as a client of enterprise network 130, device 120 may comply with policies imposed by an administrator of enterprise network 130. Those policies, for example, may include a requirement for device 120 to operate in a low power state when not actively in use. A peer-to-peer protocol may support such operation by allowing a device, even if designated a group owner, from time-to-time, to enter a low power state. A low power state may be implemented as a sleep state as is known in the art. In a sleep state, some or all of the hardware components of device 120 may be powered off. A component of device 120 that may be powered off in the sleep state is a radio supporting wireless communications. Accordingly, a device is unlikely to be able to communicate wireless when in a sleep state.

To enable a group controller to sleep, the peer-to-peer protocol used to form group 110 may incorporate a mechanism by which other devices in the group may determine that the device acting as the group owner has entered a sleep state in which it is temporarily unable to receive or send wireless communications. Such a mechanism, for example, may include broadcasting a GROUP OWNER ABSENT message.

A device that is already a member of group 110 may receive such a message and defer attempts to communicate with device 120 until device 120 exits the sleep state and has its radio again powered on for communication. Any suitable mechanism may be employed by a device, such as device 122, that is a member of group 110 to determine a time at which it can again communicate with device 120. For example, the protocol used to form group 110 may specify a sleep interval for a group owner. At the expiration of the specified interval, the group owner may temporarily exit the sleep state such that other devices may communicate with it.

In protocols in which the sleep interval is fixed, a device that is a member of the group may track time for the duration of the sleep interval following receipt of the group owner absent message such that the device may defer an attempt to communicate with the group owner until a time when the group owner has powered up its radio and is available for wireless communication. Though, the duration of the sleep interval need not be fixed, and the interval, for example, may be specified by device 120 as part of the group owner absent message.

Further, it should be appreciated that a device, such as device 122 that is joined in group 110, need not expressly know the time at which device 120 may wake up. In some embodiments, a group owner, when in an awake state, may transmit management frames, such as beacons. Such beacons may indicate to other devices that the group owner is available to receive wireless communications. Accordingly, following a sleep interval, a group owner and a device that is a client of its group may re-establish communications by the client device monitoring a channel used by the group owner to broadcast such management frames. A client device, such as device 122, upon receipt of a group owner absent message may buffer communications to the group owner. Subsequently, the client may respond to a beacon such that communications between the group owner, device 120, in this example, and the client, device 122 in this example, can be re-established.

A device, such as device 140, seeking to join group 110 could discover the existence of device 120 acting as a group owner by similarly waiting to detect a beacon from the group owner. Though, device 140, when it is initially brought into the vicinity of group 110, has less information about device 120 then device 122. For example, device 140, because it has not previously communicated as part of group 110 may not have information indicating that device 120 is a group owner. Further, device 140 may not have information indicating a channel or set of channels used by device 120 for communication of management frames in accordance with peer-to-peer protocol used to form group 110. Moreover, device 140 may not even have information that there is a group in its vicinity that can provide a service that it is seeking.

Accordingly, in a conventional protocol, device 140 may go through an extensive scanning phase in which it attempts to detect a group owner on each of multiple channels available for use by a group owner in accordance with the peer-to-peer protocol. This scanning phase may be active or passive. For example, scanning may entail listening on a channel for a period of time. If no transmissions from a group owner are detected in that period of time, device 140 may switch to a different one of the channels supported by the peer-to-peer protocol and listen for a further interval for communications from a group owner. This process of listening and then switching channels may be repeated until device 140 detects a group owner or some time out period expires.

The listening intervals used by device 140 may be specified by the peer-to-peer protocol and may compliment intervals used by a group owner to broadcast management frames, such as beacons. These intervals for broadcasting and listening may be selected to ensure that eventually a listen interval employed by device 120 will overlap a transmit interval used by device 120. Though device 140 may need to perform several iterations of a process of attempting to detect a management frame transmitted by a group owner until device 140 is synchronized with device 120 such that device 140 is listening on the same channel at the same time that device 120 is transmitting a management frame.

Though device 140 may eventually be able to detect a group 110 and communicate with its group owner, in this example device 140 may spend a relatively long period of time seeking the group owner, which may create the impression for a user of device 140 that the device is taking an undesirably long time to complete an operation that involves connecting to a group. Additionally, device 140 may have its radios operating in a relatively high power state during the time in which it is seeking a group owner. In this example, device 140 is illustrated as a portable computing device, such as a computing device with a slate form factor. Such a device may be battery operated and therefore have a limited battery life. For a battery operated device, an extended period of operation of a radio may be undesirable.

FIG. 1A illustrates a method by which wireless devices may interact to decrease the time and/or power required for device 140 to establish communication with device 120 acting as a group owner. As shown, device 140 may transmit a request 142 for information about a group owner. A device in the vicinity of device 140 may receive the request 142 and reply with information about a group owner. Device 140 may use this information to establish communication with device 120 acting as the group owner.

The request 142 may be formatted in any suitable way. In some embodiments, request 142 may be formatted as a management frame in accordance with the peer-to-peer protocol used to form group 110. As a specific example, the request 142 may be in the form of an information element inserted into a probe request message.

Any suitable device may be programmed to respond to request 142. For simplicity of illustration, only a single device is shown responding to such a request. Such a scenario may occur, for example, if there is any one suitable device in the vicinity of device 140 or if device 140 has directed the request to a specific, visible device. Though, the request may be broadcasted. In some embodiments, multiple devices may be programmed to respond to such a request. In this embodiment, a contention mechanism may be used to avoid interference. Likewise, if multiple responses are received, device 140 may synthesize information in the responses or select a single response. In the example of FIG. 1A, device 122 may be programmed to respond to request 142. In this example, device 122 may be powered from a source of AC power. Accordingly, operating device 122 need not include shutting down a radio used by device 122 so as to avoid draining a battery of device 122. In such an embodiment, device 122 may be available to provide information about a group owner even though the group owner is in a sleep state. Alternatively, in some embodiments, wireless devices, even if they enter a lower power state, may maintain a receiver powered so as to detect management frames. In the scenario illustrated in FIG. 1A, though devices within group 110 are not actively exchanging wireless messages because device 120 acting as the group owner is in a low power sleep state, device 122 may nonetheless receive and respond to request 142.

The information provided by device 122 in response to request 142 may enable device 140 to rapidly establish communication with device 120. The information, for example, may reveal to device 140 information used by device 122 to join a group with device 120. As an example, that information may include an identification of a channel or channels used by device 120 to send or receive management frames. Device 140 may use such information to listen for management frames transmitted by device 120 such that device 140 may detect the end of a sleep interval for device 120. By listening on a single channel or a small number of channels that device 120 will use, device 140 may detect a communication from device 120 faster than if device 140 had to scan across multiple possible channels.

Other information may alternatively or additionally be provided by device 122. That information, for example, may include timing information revealing when a sleep interval for device 120 may end. As a further example, information provided by device 122 may enable device 140 to determine whether group 110 provides services of the type being sought by device 140. For example, information provided by device 122 may indicate that group 110 includes a device providing printing services. In this way, device 140 may determine, even without exchanging wireless communications with device 120 acting as the group owner, whether group 110 can provide desired services. Though, it should be appreciated the specific information provided in response to a request 142 is not critical to the invention, and any suitable information that facilitates device 140 identifying and/or joining group 110 may be provided.

FIG. 1B illustrates an alternative environment in which techniques for facilitating entry of a device into a peer-to-peer group may be employed. In the example of FIG. 1B a group 160 is in existence. That group includes a device 170, here illustrated as a smart phone. Group 160 also includes a device 172. In this example, devices 170 and 172 may have negotiated formation of group 160. As part of that negotiation, device 170 may have been identified as the group owner. Device 172, here depicted as a camera equipped with wireless communications capability, is a client of device 170 in accordance with a peer-to-peer protocol used to form group 160. Accordingly, FIG. 1B provides a further example illustrating the number and the types of wireless devices that may be joined in a group. However, the specific number or type is not critical to the invention.

The type of device seeking to join a group also is not critical to the invention. In the example of FIG. 1B, device 180 is illustrated as a computing device with a tablet form factor. Such a general purpose computing device may be configured to operate as any of the devices illustrated in FIG. 1A or 1B by modifying wireless networking software of that device using known programming techniques. Though, other configuration techniques may alternatively or additionally be used. Accordingly, any suitable device may employ techniques as described herein when seeking to join an existing group.

In this scenario illustrated FIG. 1B, device 170, acting as the group owner, is operating in a sleep interval when device 180 enters the vicinity of group 160. Accordingly, though device 180 may scan for a group owner, device 180 will not immediately detect device 170 because it is neither broadcasting management frames nor responding to management frames while in sleep mode. To facilitate identification of group 160, device 180 may transmit request 182. If device 172 receives request 182, device 172 may respond with information that facilitates device 180 identifying and joining group 160. Any suitable information may be provided by device 172, including the types of information described above.

Both devices joined in a peer-to-peer wireless group and a device seeking to join a peer-to-peer wireless group may operate according to any suitable protocol. As an example, FIGS. 2A and 2B, when joined at the points labeled A and B, are a flow chart of a method of operating devices to form a wireless group as part of using the WI-FI Direct protocol. As part of the process of forming the wireless group, one of the devices may be designated as a group owner for the group. The other device, though a client rather than the group owner, may gain information about the device that is designated as the group owner. That information subsequently can be provided to a further wireless device seeking to join the group. As an example, the information may identify the group owner, indicate how the group owner may be contacted or may provide information about services available through the group.

In this example, the process 200 is illustrated as being performed by the combined action of two devices, designated Device 1 and Device 2. These devices may represent any suitable devices. For example, Device 120 and Device 122 in FIG. 1A may perform the process 200. Similarly, devices 170 and 172 in FIG. 1B may perform process 200.

In this example, process 200 begins at block 210 at which Device 1 sends a management frame in accordance with the designated protocol that initiates a discovery phase of group formation. In this example, the management frame sent at block 210 is a probe request. The probe request is a management frame in accordance with the protocol signifying that Device 1 is seeking to identify other wireless devices in its vicinity. In some embodiments, the probe request transmitted at block 210 may generically indicate that Device 1 is seeking other wireless devices. In other embodiments, the management frame transmitted at block 210 may more specifically identify a device. For example, the management frame sent at block 210 may identify a desired service that may be provided by a device or other characteristic of a device that Device 1 is seeking to join with in a group.

Regardless of the specific format of the management frame sent at block 210, process 200 may continue to block 220, which in this example is performed by Device 2. Here, Device 2 represents another wireless device in the vicinity of Device 1.

At block 222, Device 2 may formulate and transmit a management frame in response to the management frame received at block 220. In this example, the response may be formatted as a probe response frame in accordance with the WI-FI Direct protocol. The response may indicate that Device 2 is available for forming a group with Device 1. If the request transmitted at block 210 specifies criteria for a device with which Device 1 is seeking to join, the response sent at block 222 may indicate whether Device 2 meets the criteria.

Process 200 continues at block 230, which is performed by Device 1. At block 230, Device 1 may receive the response sent by Device 2 at block 222. In scenarios in which the response indicates that Device 2 is available and capable of forming a group with Device 1 in accordance with the request transmitted at block 210, process 200 may continue with a phase in which Device 1 and Device 2 establish such a group.

Such a group may be established in any suitable way, and the specific acts performed by each of Device 1 and Device 2 may depend on the specific protocol used. However, in this example, process 200 proceeds with Device 1 performing subprocess 232A and Device 2 performing subprocess 232B. During subprocesses 232A and 232B, Device 1 and Device 2 exchange messages wirelessly. Another such role may be a client.

The exchanged messages may result in roles within the group being defined for each of Device 1 and Device 2. One such role may be a device to perform control actions for the group. Such a device, in this example, may be the group owner and may perform actions, such as admitting further devices to the group. The exchange of messages in subprocesses 232A and 232B may be performed in any suitable way. Though, in the embodiment illustrated in FIGS. 2A and 2B, the messages constitute a group owner negotiation in accordance with the WI-FI Direct protocol.

Regardless of the specific form of the messages exchanged in subprocesses 232A and 232B, those subprocesses may end with Device 1 being designated as the group owner. Device 2, though designated as a client, will receive information about the group owner. That information, for example, may indicate an identifier for the group owner and operating parameters for the group owner, such as channels used by the group owner to transmit or receive management or control frames. Device 2 may retain this information in its memory for subsequent communications with the group owner. Alternatively or additionally, Device 2 may retain information about Device 1, as the group owner, for subsequent use in assisting a further wireless device seeking to join the group.

Regardless of what information is retained, process 200 may proceed to subprocess 234A, performance by Device 1, and subprocess 234B, performed by Device 2. These subprocesses are an example of a provisioning phase of group formation. In this example, provisioning includes establishing keys by which members of the group can communicate securely. Though, any other suitable information, including channels used, may be exchanged either as part of subprocesses 232A or 232B or other subprocesses.

In subprocesses 234A and 234B, Device 1 and Device 2 may exchange messages resulting in establishing one or more keys that may be used to secure communications between Device 1 and Device 2. Such keys, for example, may be used to authenticate or encrypt such communications. Though, the specific keys established and their use during subsequent communications may depend on parameters of the peer-to-peer protocol being used by the devices, and therefore are not critical to the invention. The specific messages exchanged to establish those keys also are not critical to the invention. Though, as one example, subprocesses 234A and 234B may be performed according to a WI-FI Protected Access (WPA2) protocol or any other suitable protocol.

Regardless of the specific keys established, process 200 may continue to subprocess 236A, performed by Device 1, and subprocess 236B, performed by Device 2. In subprocesses 236A and 236B, Device 1 and Device 2 may communicate. Such communications may entail exchanging data frames. Alternatively or additionally, communications may entail exchanging management and/or control frames. The specific acts performed as part of subprocesses 236A and 236B may depend on the nature of Device 1 and Device 2. For example, if Device 2 is a printer, as illustrated by device 122 (FIG. 1A), communication may entail data representing a document for printing. In scenarios in which a Device 2 is a camera, such as device 172 (FIG. 1B), communication may entail transmission of data representing a photographic image. Though, it should be appreciated the specific nature of the data communicated is not critical to the invention.

Such an exchange of data may continue until block 250. At block 250, Device 1 may enter a low power state or otherwise temporarily unavailable for actions as a group owner. Device 1 may enter any suitable low power state. For example, it may entirely turn off its radio and/or other circuitry. Alternatively, Device 1 may enter a state in which it selectively responds to messages or in any other way reduces processing performed as a way to save power.

Regardless of the specific implementation of the low power state, Device 1 may enter this state based on any suitable criteria. For example, Device 1 may enter the state in accordance with a policy implemented on Device 1 by a network administrator or other entity controlling operation of Device 1. The policy may be set in any suitable way and may be unrelated to peer-to-peer communications. For example, in FIG. 1A, device 120 may enter a sleep state to comply with a policy of enterprise network 130. In accordance with such a policy, Device 1 may periodically enter such a low power "sleep" state. As an example, in some embodiments, Device 1 may opportunistically enter a low power state in response to detecting conditions under which actions as a group owner are not required. As an example, Device 1 may enter a sleep state following an interval of a threshold duration in which Device 1 does not receive communications from Device 2 or other devices.

Regardless of a basis for initiating the sleep state, Device 1 may transmit a management frame, signifying that it is entering the sleep state. Such a management frame may be formatted in any suitable way. In embodiments in which Device 1 is operating according to the WI-FI direct protocol, the management frame may be formatted as a group owner absent message. That message may contain values indicating one or more of a start time of a sleep interval, a duration of the sleep interval, an interval between consecutive sleep intervals and/or a count, representing a number of sleep intervals that Device 1 will enter into without sending a subsequent notice.

At block 252, Device 1 may then shut down its radio or otherwise enter into a state when it is unavailable to send or receive messages as a group owner. Regardless of the information contained in the management frame sent at block 250, Device 2 may receive that information at block 260. Device 2 may store all or part of the information for subsequent use in contacting the group owner. For example, Device 2 may use the received information to track times at which the group owner is available and times at which the group owner is unavailable. As one example, at block 262, Device 2 may set one or more timers to track when Device 1 is available for communication.

Process 200 may then enter sleep interval 254 during which Device 1 does not communicate with Device 2. Device 1, during that interval, may not communicate because its radio is shut down so that Device 1 may remain a low power state. Device 2 may also enter a low power state. Though, Device 2 may continue to perform other operations during the interval during which Device 1 is unavailable as the group owner.

Regardless of the specific actions taken by Device 1 and Device 2 during the sleep interval 254, the sleep interval may end at block 270, where Device 1 may wake up. Processing at block 270 may be performed using techniques as are known in the art. For example, Device 1 may, during the sleep interval, run a low power timer that expires at the end of the sleep interval, triggering a hardware interrupt that causes Device 1 to enter a powered up state.

Regardless of the specific mechanism by which Device 1 wakes up at block 270, process 200 may continue to subprocesses 272A, performed by Device 1, and subprocess 272B, performed by Device 2. In subprocess 272A, Device 1, having woken up, is available for communication. In subprocess 272B, Device 2, having waited the designated sleep interval for Device 1, may again attempt to communicate with device 1. Accordingly, subprocesses 272A and 272B may entail communications of the type described above in connection with subprocesses 236A and 236B.

Process 200 may then end. Though, it should be recognized that portions of process 200 may be repeated by looping back, for example, to block 250 where the group owner may again enter a low power state for a further sleep interval 254. In embodiments in which the sleep interval is periodically repeated, the process may loop back to block 252, for example.

Figure 2B:
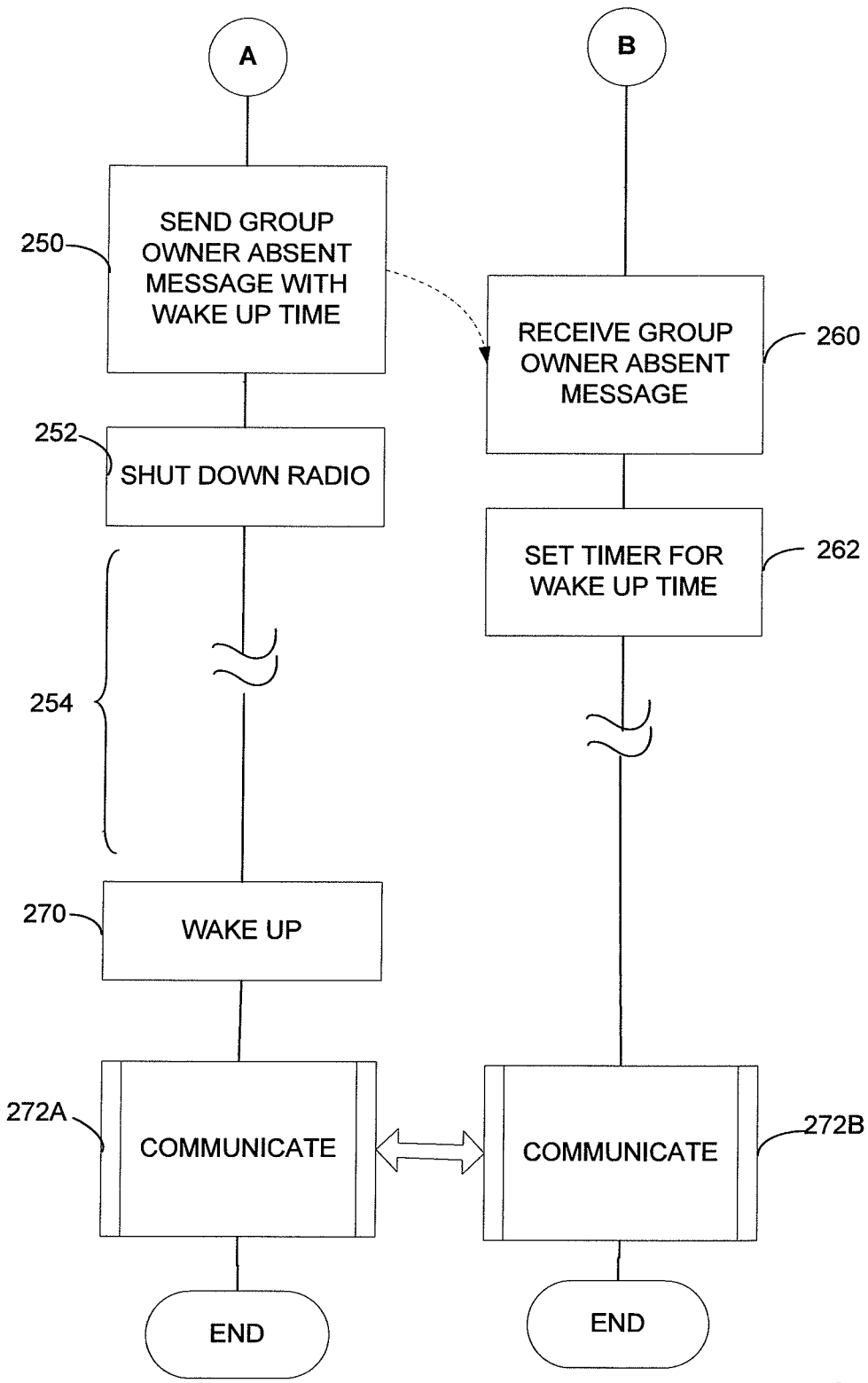

The processing of FIGS. 2A and 2B may be performed using techniques as are known in the art. If, during sleep interval 254, a third device seeks to join the group containing Device 1 and Device 2, that joining device will be unable to join the group because the group owner, Device 1 in this example, is unavailable for performing control functions required to admit a further device to the group. During sleep interval 254, a joining device may be actively or passively scanning for a group owner. Though, because Device 1 is unavailable, the joining device will be unable to join the group, and will even be unable to identify that a group exists. Such a delay may create frustration for a user of a joining device.

Alternatively or additionally, such a delay, if the joining device is performing communication operations or other high power operations during that interval, may drain a battery of the joining device. Accordingly, in some embodiments, Device 2 may be adapted to respond to a joining device during interval 254 in a way that accelerates synchronization between the joining device and Device 1, acting as a group owner, or reduces power drain on the joining device to synchronize. Such an adaptation may be made by programming wireless communication software within Device 2. Though, such an adaptation may be made in hardware or other suitable components of Device 2.

Figure 3:
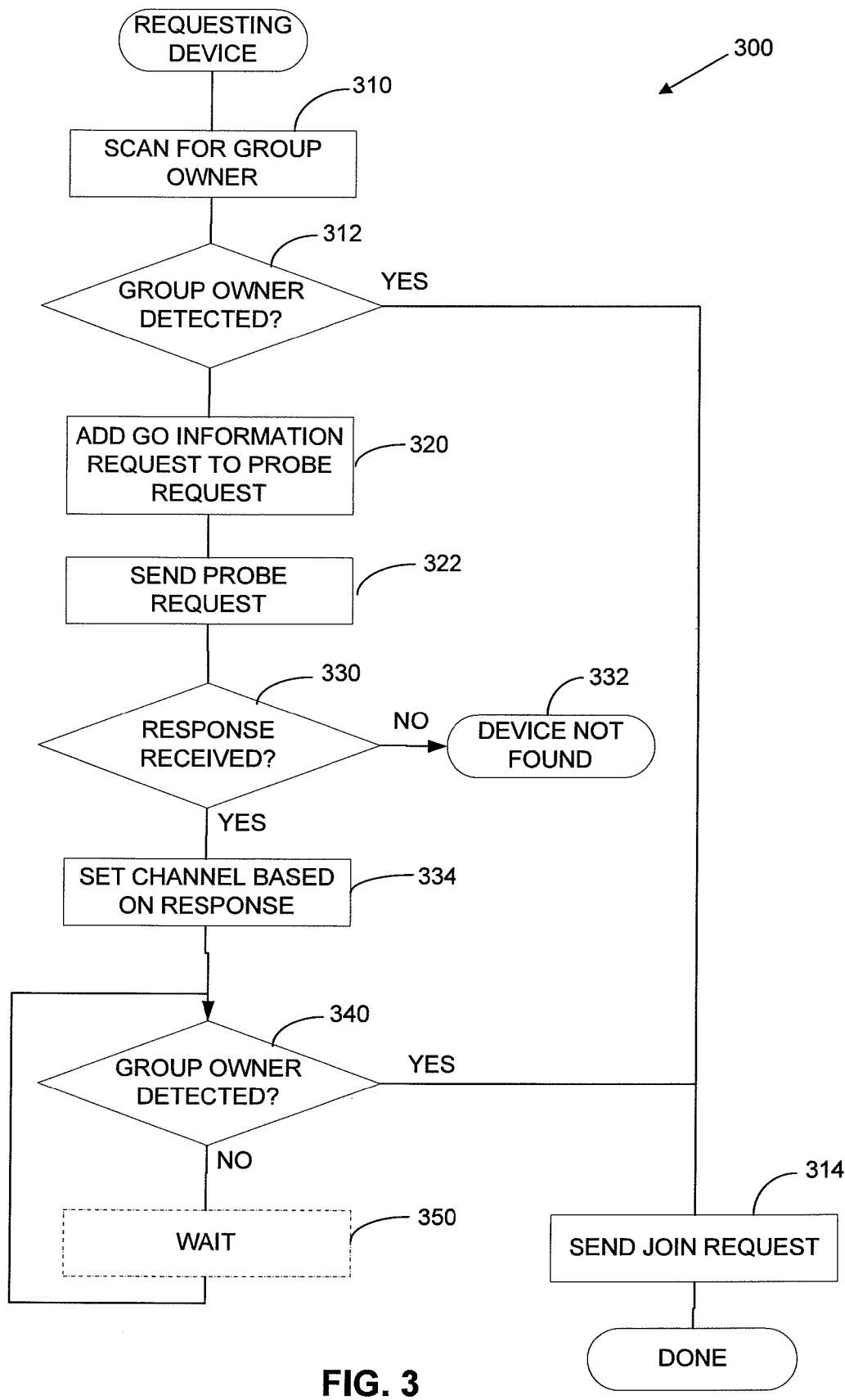
FIG. 3 is a flow chart of an illustrative method of operation of a wireless device seeking to join an existing group according to some embodiments of the invention.

FIG. 3 illustrates a process 300 that may be performed by a joining device when encountering a group including a suitably modified device acting as a client joined to a group owner that is absent. The process 300 may be performed by a joining device, such as device 140 (FIG. 1A) or a device 180 (FIG. 1B). Though, it should be appreciated that the specific type of device seeking to join a group is not critical to the invention, and any suitable device may perform process 300.

Process 300 begins at block 310 where the device seeking to join a group may scan for a group owner. Process 300 may begin, for example, when a user of the joining device provides input indicating a desire for the joining device to connect with another wireless device. The user, for example, may provide a command indicating that the joining device should connect to a printer or other peripheral device. Alternatively, the user may provide some other form of input, such as input indicating that the joining device should connect to another computing device for exchanging files or other information.

Regardless of the trigger for initiating process 300, the joining device may begin a process of attempting to locate a group owner. Such a process may entail listening for communications from a group owner. In some embodiments, processing at block 310 may include transmitting management frames that may prompt a group owner to respond. Accordingly, the scan performed at block 310 may be an active or a passive scan. The specific technique used for scanning for a group owner may depend on the specific protocol used for forming peer-to-peer groups or other criteria.

Regardless of the specific technique used for scanning at block 310, process 300 may continue to decision block 312. The process may branch at decision block 312, depending on whether a group owner was detected at block 310. If a group owner was detected, the process may branch at decision block 312 to block 314. At block 314, the joining device may initiate actions that result in the joining device joining the group managed by the detected group owner. As an example, at block 314, the joining device may send a join request management frame. Such a message may be formalized in accordance with the protocol for managing the peer-to-peer group.

Regardless of the specific format of such a request, FIG. 3 illustrates that process 300 ends following transmission of the join request at block 314. Though, it should be appreciated that process 300 may continue, with further steps required for the joining device to become a client of the identified group owner and further exchange communications with the group owner and possibly other devices in the group. Such actions may be performed in accordance with the established protocol for the peer-to-peer group and are not expressly illustrated in FIG. 3 for simplicity.

Conversely, if no group owner is detected, the process may proceed from decision block 312 to block 320. Block 320 represents the beginning of a portion of process 300 in which the joining device requests information about a group owner that the joining device can then use to contact the group owner. In this example, processing at block 320 involves transmitting a management frame containing an indication that the joining device is requesting information about a group owner. The request may be formatted in any suitable way. In the example illustrated, the request may be signified by an information element added to a management frame that is otherwise specified as part of the peer-to-peer protocol used for the group. As a specific example, the request may be formatted as an information element in a probe request in accordance with the WI-FI Direct protocol.

The request may be a conditional request, which may be conditioned in any suitable way. For example, the request may specify characteristics of a group owner about which information is requested. A specific example, if the requesting device is requesting information about a group owner for a group that provides a specific service, the information included in the request at block 320 may identify the requested service.

Regardless of the formatting of such a request, the process may proceed to block 322 where the request may be transmitted. Such a transmission may be performed using techniques as are known in the art.

At block 330, process 300 may branch, depending on whether a response is received to the request. If no response is received within some time limit, the process may branch to termination point 332. If process 300 ends at termination point 300, the joining device may take action appropriate for a scenario in which a group owner can not be found. Such processing may be performed using techniques as are known in the art, and may depend on the scenario for which the requesting device is attempting to join a group.

Conversely, if a response is received, indicating that a group owner is in the vicinity but temporarily unavailable, the process may branch from decision block 330 to block 334. Block 334 may represent the beginning of a portion of process 300 in which the joining device uses information received in the response to efficiently contact the group owner. The specific actions taken as part of that processing may depend on the specific information received. In this example, a response received may identify a channel used by a group owner for communication of management frames. In that scenario, the requesting device may, at block 334, set a channel based on information in the response. The requesting device, for example, may use a known technique to park on the channel to detect a communication from the group owner when the group owner is next available.

Though, it should be appreciated that parking on a channel to listen for a communication from a group owner is just one example of an action that may be taken to more efficiently establish communication with a group owner. For example, if the response received identifies a timing at which the group owner may be available, the processing performed by the requesting device may alternatively or additionally entail deferring an attempt to connect with the group owner until the specified time.

Accordingly, FIG. 3 shows that process 300 may proceed to decision block 340. At decision block 340, the process may again branch depending on whether the requesting device is successful in contacting the group owner. If so, the process may branch to block 314, which, as described above, may begin processing by which the requesting device joins the group.

Conversely, if the group owner is not detected immediately, the joining device may wait for the group owner to become available. FIG. 3 illustrates an embodiment in which the joining device has information about a time until the group owner will end a sleep interval. Accordingly, at decision block 340, the process may branch to block 350. At block 350, the requesting device may wait until the group owner is expected to be available. In embodiments in which the response to a request for information about a group owner includes timing information about the availability of the group owner, the length of the wait at block 350 may be selected to delay further attempts to connect with the group owner until a time when the group owner is indicated to be available. Though, FIG. 3 illustrates waiting at block 350 is an optional step. In embodiments in which no timing information is obtained in response to a request for group owner information, waiting at block 350 may be omitted.

Regardless, of whether a wait is performed at block 350, process 300 may loop back to decision block 340 until the group owner is detected. Though not expressly illustrated in FIG. 3, the number of times such a loop back is performed may be limited and, in some embodiments, even when a response is received, the loop illustrated as involving decision block 340 and, optionally, block 350 may time out or include other suitable termination criteria. If such termination criteria are encountered, processing may, for example, proceed to termination point 332 or end in any other suitable way.

A joining device may be configured to execute process 300 in any suitable way. In some embodiments, communication software within an operating system of a computing device may be configured to perform process 300. Such a modification may, for example, be appropriate when the joining device is a general purpose computing device with an operating system. In other embodiments, a wireless device may be configured to perform process 300 by modification of special purpose communication software or hardware components within the device. Such modifications may be made in accordance with techniques as are known in the art for controlling a wireless device to perform communications or in any other suitable way such that a device seeking to join a network may request and use information about a group owner that may be temporarily absent.

Figure 4:
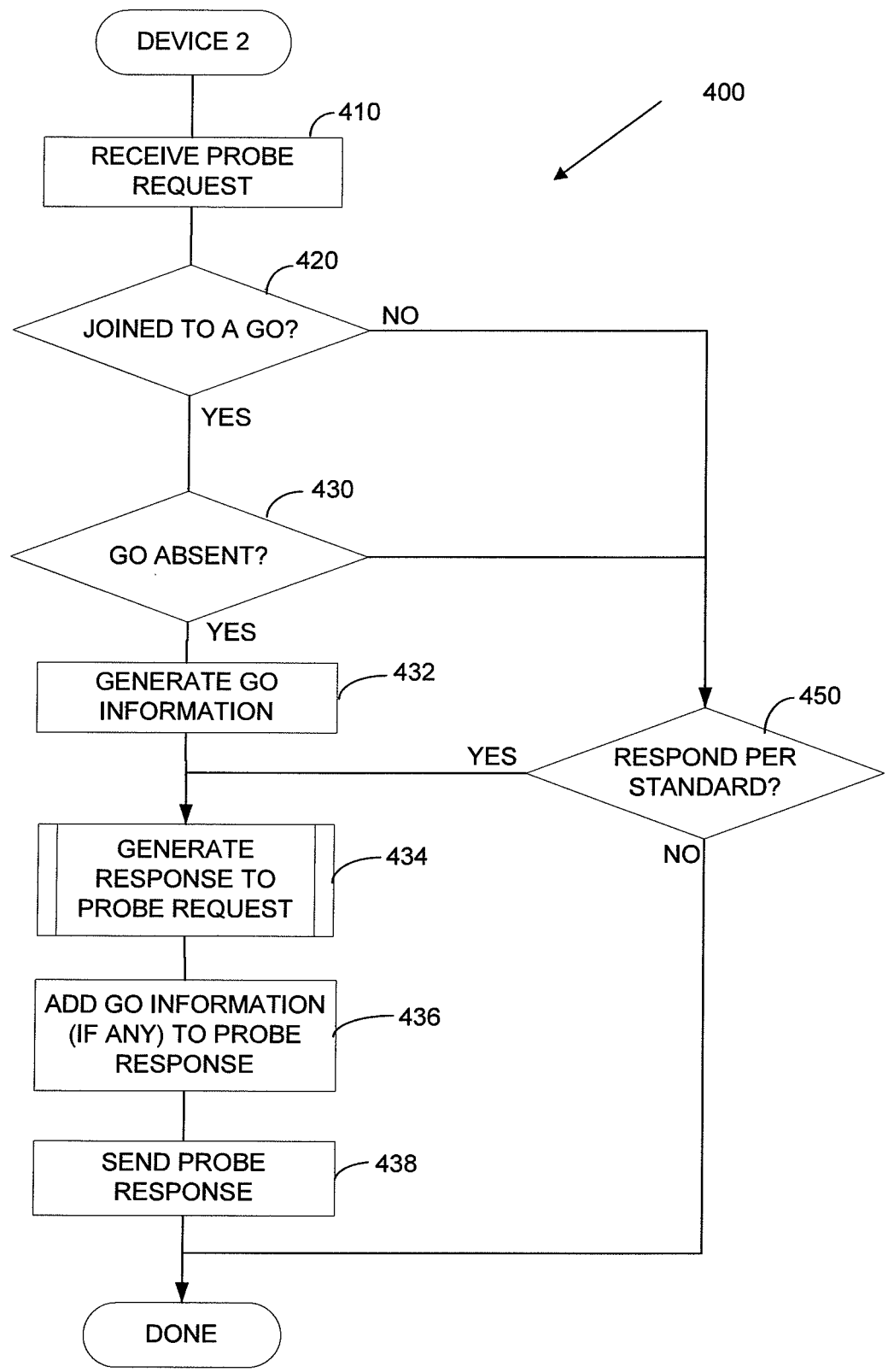
FIG. 4 is a flow chart of an exemplary method of operation of a device responding to a request for information about a group owner in accordance with some embodiments of the invention.

FIG. 4 illustrates a process 400 that may be performed by another wireless device in response to such a request. In the example of FIGS. 2A and 2B, such a device may be Device 2, representing a client of a group owner that is temporarily absent. Such a device may be programmed to conditionally perform the process 400 during an interval, such as interval 254 (FIG. 2B), in which the group owner is absent. A wireless device may similarly be configured to perform the process 400 in any suitable way, including through modification of communication software or hardware components using techniques as are known in the art.

Accordingly, the process 400 begins when the client device receives a request for information about a group owner. The request may be in any suitable format, but in the embodiment illustrated has the format of the management frame sent at block 322 (FIG. 3).

When such a request is received, process 400 proceeds to decision block 420. Processing at decision block 420 may branch, depending on whether the client device is joined to a group owner. Though, it should be appreciated that FIG. 4 illustrates one possible embodiment. In other embodiments, process 400 may branch to decision block 450 if Device 2 has no information about a group owner. If Device 2 has information, even if not joined in a group with the group owner, this process may continue to decision block 430.

Though, in the embodiment illustrated, if the device is not joined to a group owner, the process may branch to decision block 450. At decision block 450, process 400 may again branch. The branch condition at decision block 450 may be based on whether a device that is not joined to a group owner would, absent modifications as described herein to facilitate efficient joining of a device to a network, responds to the type of management frame received at block 410. If the standard does not prescribe a response to such a management frame, the process may end following decision block 450. Conversely, if a response is prescribed in the standard, process 400 may branch from decision block 450 to sub process 434 where that response is generated in accordance with the standard.

Conversely, if it is determined at decision block 420, that Device 2 is joined to a group owner, the process may proceed to decision block 430. At decision block 430, the process may branch, depending on whether the group owner is currently absent. For example, if the management frame received at block 410 arrives during interval 254 (FIG. 2B), processing may proceed from decision block 430 to block 432.

Otherwise, if the group owner is not absent, process 400 may branch from decision block 430 to decision block 450. As described above, decision block 450 may represent a beginning of a portion of process 400 in which a response to a probe request is generated in accordance with the standard peer-to-peer protocol used for the group. In the embodiment illustrated in FIG. 4, such processing allows the group owner to respond to the management frame received at block 410, if the group owner is present such that Device 2 provides information about the group owner only if the group owner is absent.

It should be appreciated, though, that other embodiments are possible. For example, in some embodiments, Device 2 may respond to a request for information about a group owner even if the group owner is present. Such a response may enable the requesting device to more efficiently connect with the group owner. For example, the requesting device may be unaware of the channels used by the group owner. A response from Device 2, if it conveys channel information, may be used by the requesting device as indicated, for example, at block 334 (FIG. 3) to more efficiently connect with the group owner. Accordingly, it should be appreciated that FIG. 4 is illustrative rather than limiting, of possible responses to a management frame containing a request for information about a group owner.

In the embodiment illustrated in FIG. 4, if the group owner is absent, process 400 branches from decision block 430 to block 432. At block 432, Device 2 may generate information about the group owner. The information may be generated in any suitable way. In some embodiments, generation of information at block 432 may entail copying information from memory on Device 2. Such information may include any or all of the information obtained by Device 2 during the performance of process 200 (FIGS. 2A and 2B). That information may include communication parameters for the group owner obtained as part of sub process 232B or any other provisioning steps in process 200. That information may also include information obtained at block 260 as part of a message indicating that the group owner will be temporarily unavailable. Though, the information may be generated in any suitable way. For example, Device 2 may calculate, based on information received at block 260, a next time when the group owner is scheduled to be available.

Regardless of the manner in which the group owner information is generated at block 432, the process 400 may proceed to sub process 434. Sub process 434 may entail generating a response to the management frame received at block 410. A response may be generated as part of sub process 434 in accordance with the peer-to-peer protocol used in forming a peer-to-peer group. For example, in the Wi-Fi Direct protocol, a probe reply management frame may be generated in response to a probe request, which may be received at block 410. The specific format of the response generated as part of sub process 434 is not critical to the invention. Any suitable message format that may be detected and processed by a requesting device may be used.

Regardless of the format of the response generated during sub process 434, process 400 may proceed to block 436. At block 436, group owner information generated at block 432, if any, may be added to the response generated in sub process 434. This information may be added to the response in any suitable way. In some embodiments, the group owner information may be incorporated as an information element in the response. An information element constitutes information that is not necessarily prescribed by a communications standard but is added to a portion of a message. The information element may be added to a portion of the message provided, in accordance with a standard, for receiving information elements.

Regardless of the format of the response and the manner in which information about the group owner is incorporated into the response at block 436, the process may proceed to block 438 where the response is sent. Process 400 may then end. Though, the process may be repeated at any time that a further management frame, signifying a request for information about a group owner, is received.

Figure 5A:
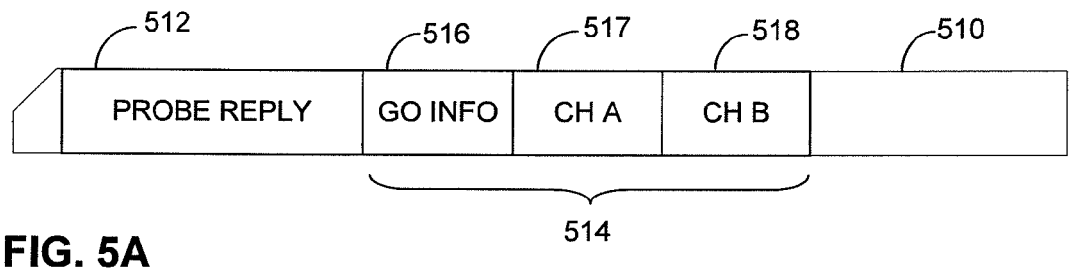
FIGS. 5A, 5B, 5C and 5D are schematic representations of alternative embodiments of illustrative responses to a request for information about a group owner in accordance with some embodiments of the invention.
Figure 5B:
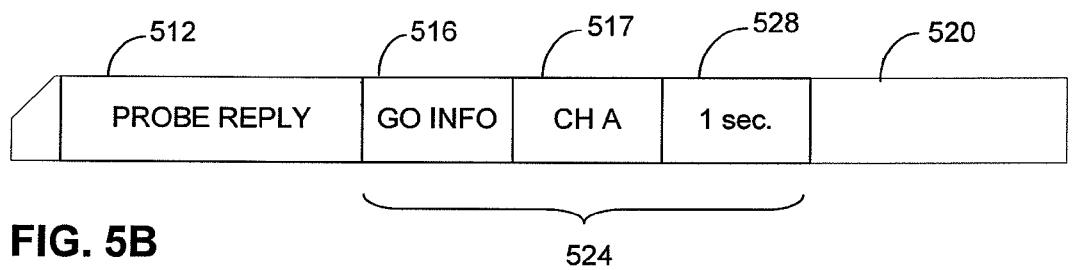
Figure 5C:
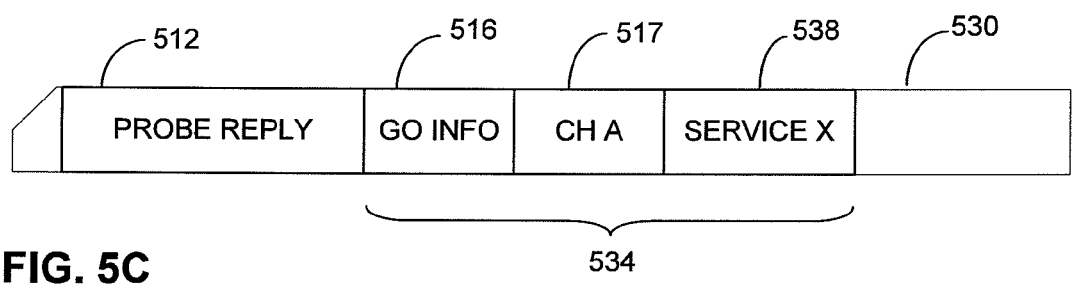
Figure 5D:
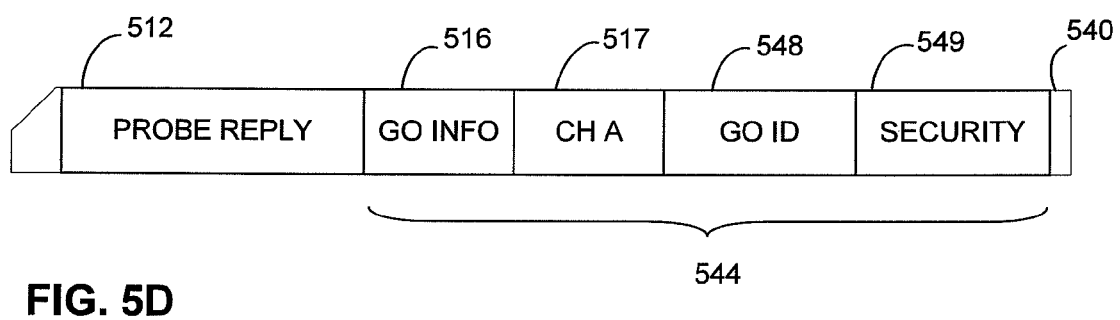

The response transmitted at block 434 may be in any suitable format and may contain any suitable information. FIGS. 5A, 5B, 5C and 5D illustrate four alternative embodiments of such a response. In these examples, FIG. 5A illustrates a response 510. FIG. 5B illustrates a response 520. FIG. 5C illustrates a response 530 and FIG. 5D illustrates a response 540. Each of the responses 510, 520, 530 and 540 is formatted as a probe reply management frame. Such a format may be appropriate in an embodiment in which the WI-FI Direct protocol is employed. Though, the specific format of the message is not critical to the invention.

In this example, each of the replies 510, 520, 530 and 540 includes a field 512 indicating the type of management frame used to communicate the response. Accordingly, in each example embodiment, field 512 includes a value indicating that the reply is formatted as a probe reply management frame.

Each of the replies 510, 520, 530 and 540 contains an information element containing group owner information. Accordingly, reply 510 is shown to contain an information element 514. Reply 520 is shown to contain an information element 524. Reply 530 is shown to contain information element 534, and reply 540 is shown to contain an information element 544.

In the embodiment illustrated in FIG. 5A, information element 514 contains fields 516, 517 and 518. In that embodiment, field 516 contains a value, indicating the type of information element 514. In this case, the value in field 516 indicates that information element 514 contains group owner information. In some embodiments this value may also signify that the group owner is currently in a sleep state. Other fields in information element 514 contain values of parameters representing group owner information. In this example, information element 514 conveys channel information about the group owner. Specifically, in this example, the group owner may send and receive management frames on two channels. Accordingly, two fields, field 517 and field 518, are shown containing information about the group owner. Field 517 contains information indicating that the group owner uses a channel designated channel A. Field 518 contains information indicating that the group owner uses a channel designated channel B. It should be appreciated that FIG. 5A schematically illustrates a format of a reply and that the information in reply 510 need not be configured in precisely defined fields as indicated. Rather, the information may be represented in any suitable way.

Similarly, FIGS. 5B . . . 5D schematically represent information that may be communicated in a reply in other embodiments. For example, FIG. 5B illustrates that information element 524 similarly contains fields 516 and 517, indicating that information element 524 contains group owner information and revealing a channel on which the group owner communicates. In addition, information element 524 may include field 528 containing timing information. Timing information in field 528, for example, may reveal to a recipient of reply 520 an amount of time until the group owner is scheduled to end its current sleep interval. Time information in field 524 may be formatted in any suitable way. For example, time information may be formatted as a number of seconds, clock ticks or other suitable measure of time until the end of the group owner's sleep interval. Alternatively or additionally, the time information may be formatted in terms of a time at which the group owner is scheduled to end its current sleep interval. Such a formatting may be appropriate in scenarios in which a common time reference is available to a device joined to a group and a device seeking to join the group. Though, it should be appreciated that the specific format of time information is not critical to the invention, and any suitable representation of time may be included in reply 520.

FIG. 5C schematically illustrates a further configuration of a reply 530. In the illustrated embodiment, reply 530 includes an information element 534. As with information element 514, information element 534 includes fields 516 and 517, indicating that the information element contains group owner information and information or a channel on which that group owner communicates.

In this example, information element 534 additionally contains service information in field 538. A value or values in field 538 may indicate a service or services available to a device that joins to the group owner. These services may represent services provided by the group owner or accessible in the group managed by the group owner.

FIG. 5D schematically illustrates a further embodiment of a reply 540. As with information element 514, information element 544 also includes fields 516 and 517, indicating that the information element contains group owner information and a channel on which the group owner communicates. Additionally, information element 544 contains fields 548 and 549.

In this example, field 548 contains an identification of the group owner. As one example, the group owner may be identified by a basic service set identifier (BSSID) in accordance with the WI-FI Direct protocol. Though, the specific identification of the group owner may depend on the protocol used in forming a peer-to-peer group.

Additionally, information element 544 may contain a field 549 with security information. Security information in field 549 may take any suitable form and may be used for any suitable purpose. As one example, the security information in field 549 may provide a mechanism for a requesting device that receives reply 540 to authenticate a device transmitting reply 540. Alternatively or additionally, security information in field 549 may be used by a requesting device to verify that reply 540 was not tampered with after it was sent.

Such security information may be generated in any suitable way. For example, the security information may be generated using a cryptographic function and a key or certificate available to a trusted device. Such security mechanisms are known in the art and any suitable such security mechanism may be used. Regardless of the manner in which the security information in field 549 is generated, a requesting device that receives a reply 540 may use the information to avoid using unreliable group owner information. For example, if a requesting device were to use unreliable information about a group owner, it may park on a channel that the group owner does not use. In this scenario, rather than expediting synchronization with a group owner, using information in a reply may delay synchronizing with a group owner.

It should be appreciated at FIGS. 5A . . . 5D represent examples of combinations of information that may be included in a reply to a request for information about a group owner. The types of information illustrated in FIGS. 5A, 5B, 5C and 5D may be used in any suitable combination. Moreover, different or additional types of information may be incorporated in such a reply.

Figure 6:
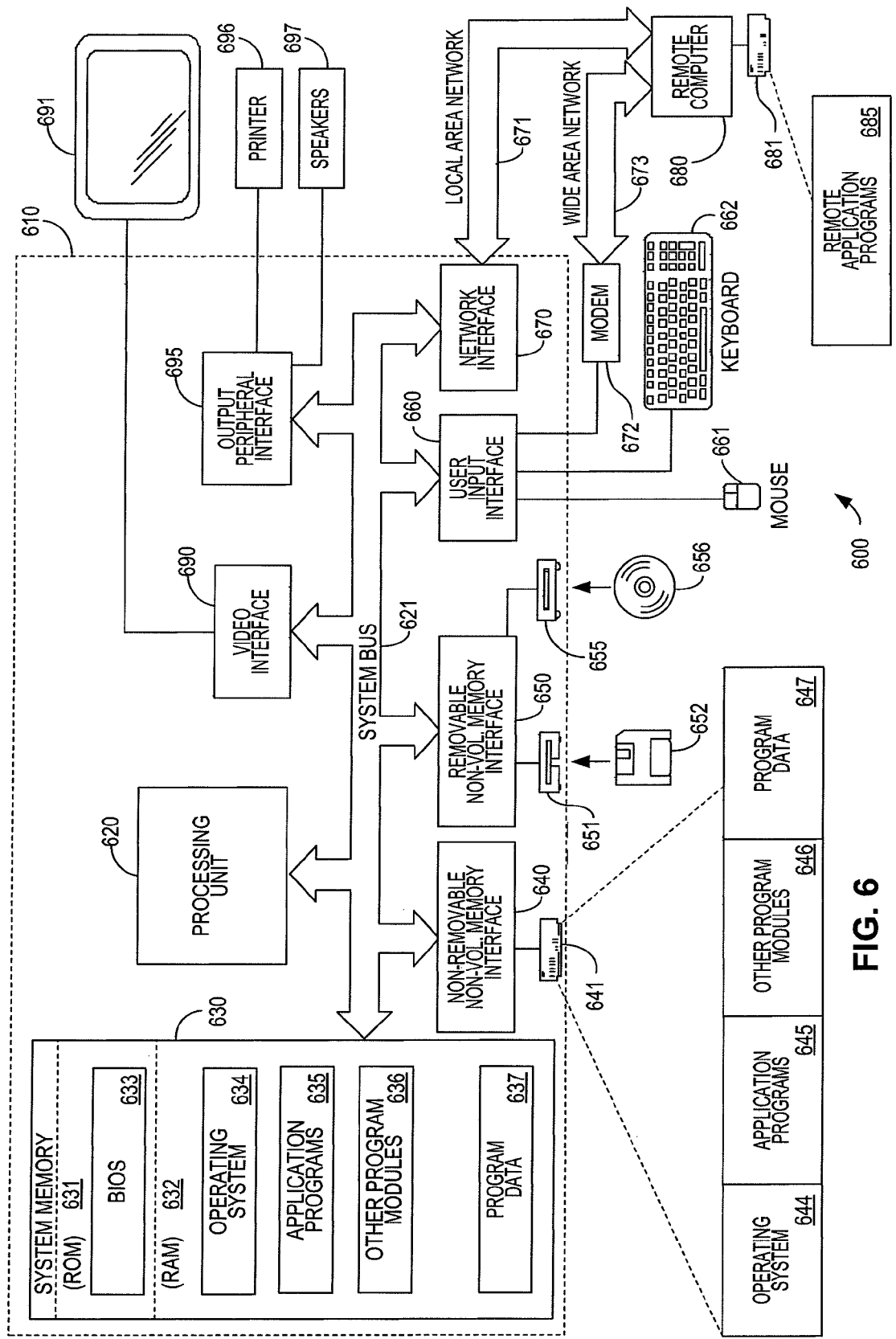
FIG. 6 is a block diagram of a computing device that may be programmed to operate as a group owner, a requesting device or a responding device in accordance with embodiments of the invention.

FIG. 6 illustrates an example of a suitable computing system environment 600 on which the invention may be implemented. Such a system may be representative of any of the devices described herein, including a group owner, a client or a joining device. The computing system environment 600 is only one example of a suitable computing environment and is not intended to suggest any limitation as to the scope of use or functionality of the invention. Neither should the computing environment 600 be interpreted as having any dependency or requirement relating to any one or combination of components illustrated in the exemplary operating environment 600.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The computing environment may execute computer-executable instructions, such as program modules. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 6, an exemplary system for implementing the invention includes a general purpose computing device in the form of a computer 610. Components of computer 610 may include, but are not limited to, a processing unit 620, a system memory 630, and a system bus 621 that couples various system components including the system memory to the processing unit 620. The system bus 621 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 610 typically includes a variety of computer readable media. Computer readable media can be any available media that can be accessed by computer 610 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 610. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 630 includes computer storage media in the form of volatile and/or nonvolatile memory such as read only memory (ROM) 631 and random access memory (RAM) 632. A basic input/output system 633 (BIOS), containing the basic routines that help to transfer information between elements within computer 610, such as during start-up, is typically stored in ROM 631. RAM 632 typically contains data and/or program modules that are immediately accessible to and/or presently being operated on by processing unit 620. By way of example, and not limitation, FIG. 6 illustrates operating system 634, application programs 635, other program modules 636, and program data 637.

The computer 610 may also include other removable/non-removable, volatile/nonvolatile computer storage media. By way of example only, FIG. 6 illustrates a hard disk drive 640 that reads from or writes to non-removable, nonvolatile magnetic media, a magnetic disk drive 651 that reads from or writes to a removable, nonvolatile magnetic disk 652, and an optical disk drive 655 that reads from or writes to a removable, nonvolatile optical disk 656 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 641 is typically connected to the system bus 621 through a non-removable memory interface such as interface 640, and magnetic disk drive 651 and optical disk drive 655 are typically connected to the system bus 621 by a removable memory interface, such as interface 650.

The drives and their associated computer storage media discussed above and illustrated in FIG. 6, provide storage of computer readable instructions, data structures, program modules and other data for the computer 610. In FIG. 6, for example, hard disk drive 641 is illustrated as storing operating system 644, application programs 645, other program modules 646, and program data 647. Note that these components can either be the same as or different from operating system 634, application programs 635, other program modules 636, and program data 637. Operating system 644, application programs 645, other program modules 646, and program data 647 are given different numbers here to illustrate that, at a minimum, they are different copies. A user may enter commands and information into the computer 610 through input devices such as a keyboard 662 and pointing device 661, commonly referred to as a mouse, trackball or touch pad. Other input devices (not shown) may include a microphone, joystick, game pad, satellite dish, scanner, or the like. These and other input devices are often connected to the processing unit 620 through a user input interface 660 that is coupled to the system bus, but may be connected by other interface and bus structures, such as a parallel port, game port or a universal serial bus (USB). A monitor 691 or other type of display device is also connected to the system bus 621 via an interface, such as a video interface 690. In addition to the monitor, computers may also include other peripheral output devices such as speakers 697 and printer 696, which may be connected through an output peripheral interface 695.

The computer 610 may operate in a networked environment using logical connections to one or more remote computers, such as a remote computer 680. The remote computer 680 may be a personal computer, a server, a router, a network PC, a peer device or other common network node, and typically includes many or all of the elements described above relative to the computer 610, although only a memory storage device 681 has been illustrated in FIG. 6. The logical connections depicted in FIG. 6 include a local area network (LAN) 671 and a wide area network (WAN) 673, but may also include other networks. Such networking environments are commonplace in offices, enterprise-wide computer networks, intranets and the Internet.

When used in a LAN networking environment, the computer 610 is connected to the LAN 671 through a network interface or adapter 670. Such an adapter may include or allow access to one or more radios to support wireless communication. When used in a WAN networking environment, the computer 610 typically includes a modem 672 or other means for establishing communications over the WAN 673, such as the Internet. The modem 672, which may be internal or external, may be connected to the system bus 621 via the user input interface 660, or other appropriate mechanism. In a networked environment, program modules depicted relative to the computer 610, or portions thereof, may be stored in the remote memory storage device. By way of example, and not limitation, FIG. 6 illustrates remote application programs 685 as residing on memory device 681. It will be appreciated that the network connections shown are exemplary and other means of establishing a communications link between the computers may be used.

Having thus described several aspects of at least one embodiment of this invention, it is to be appreciated that various alterations, modifications, and improvements will readily occur to those skilled in the art.

For example, though embodiments were described in which the group owner is unavailable for communication because the group owner is in a sleep state, techniques as described herein may be used regardless of the reason why the group owner is "absent" from the group.

Also, it is described that a device supplies group owner information in response to a request. It is not a requirement that the information be supplied in response to a specific request. For example, a device may periodically transmit such information when the group owner is absent or when it detects a device scanning, even if there is no explicit request for information.

As another example, FIGS. 5A . . . 5D illustrate embodiments in which channel information is expressly encoded in an information element. In some embodiments, channel information may be implicitly conveyed. For example, a probe request may be sent at block 322 using a specific channel. The response at block 438 may be sent only if the absent group owner communicates on that channel. Accordingly, any receipt of a response may implicitly identify that channel.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other non-transitory, tangible computer storage medium) encoded with one or more programs that, when executed on one or more computers or other processors, perform methods that implement the various embodiments of the invention discussed above. The computer readable storage medium or media can be transportable, such that the program or programs stored thereon can be loaded onto one or more different computers or other processors to implement various aspects of the present invention as discussed above. As used herein, the term "non-transitory computer-readable storage medium" encompasses only a computer-readable medium that can be considered to be a manufacture (i.e., article of manufacture) or a machine. Alternatively or additionally, the invention may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method of operating a first wireless device, the method comprising:
    wirelessly transmitting a first message, the first message being formatted in accordance with a peer-to-peer networking protocol;
    receiving a response to the first message via a wireless communications medium, the response being received from a second wireless device and the response providing information regarding when a third wireless device is expected to be awake; and
    using the information regarding when the third wireless device is expected to be awake to establish wireless communications with the third wireless device, the using of the information to establish the wireless communications comprising:
        deferring monitoring a channel used by the third wireless device according to the information regarding when the third wireless device is expected to be awake; and
        wirelessly transmitting a join request for a peer-to-peer wireless network controlled by the third wireless device according to the peer-to-peer networking protocol to the third wireless device.

2. The method of claim 1, wherein:
the information comprises an indication that the third wireless device is in a sleep state.

3. The method of claim 2, wherein:
the information comprises an indication of the channel used by the third wireless device.

4. The method of claim 3, wherein using the information to establish communication comprising:
    configuring a radio of the first wireless device to monitor the channel.

5. The method of claim 1, wherein:
the peer-to-peer networking protocol is a WI-FI Direct protocol.

6. The method of claim 5, wherein the first message is a probe request message for joining the peer-to-peer wireless network.

7. The method of claim 6, wherein the probe request message comprises an information element requesting a reply identifying a group owner of the peer-to-peer wireless network if the group owner is in an unavailable state.

8. The method of claim 1, wherein:
    the first message comprises an information element requesting information about an established peer-to-peer wireless network of peer-to-peer devices.

9. The method of claim 1, wherein:
    the information regarding when the third wireless device is expected to be awake includes an indication of a time at which the third wireless device is expected to be awake; and
    using the information regarding when the third wireless device is expected to be awake to establish communications with the third wireless device comprises determining that the indicated time is reached.

10. A method of operating a wireless device, the method comprising:
    storing information about a device controlling a peer-to-peer wireless network of devices formed in accordance with a peer-to-peer networking protocol;
    receiving a first message from a first device via a wireless communications medium, the first message comprising an information element indicating a request for information about the peer-to-peer wireless network formed in accordance with the peer-to-peer networking protocol;
    based on the stored information, formatting a response to the first message including information about the device controlling the peer-to-peer wireless network, wherein the information about the device controlling the peer-to-peer wireless network includes an indication of a time at which the device controlling the peer-to-peer wireless network is expected to be awake; and
    wirelessly transmitting the response to the first device, wherein wirelessly transmitting the response to the first device, wherein the first device then:
        defers monitoring a channel used by the device controlling the peer-to-peer wireless network based on the information regarding when the device controlling the peer-to-peer wireless network is expected to be awake; and
    transmits a request to join the peer-to-peer wireless network to the device controlling the peer-to-peer wireless network.

11. The method of claim 10, wherein:
storing information about the device controlling the peer-to-peer wireless network comprises storing information obtained in an exchange of messages with the device controlling the peer-to-peer wireless network.

12. The method of claim 10, wherein:
the method further comprises receiving an indication from the device controlling the peer-to-peer wireless network that the device controlling the peer-to-peer wireless network is entering a sleep state; and
storing information about the device controlling the peer-to-peer wireless network comprises storing information obtained in the received indication.

13. The method of claim 10, wherein:
the first message comprises a probe request message for joining the peer-to-peer wireless network.

14. The method of claim 10, wherein:
the response comprises a probe response message comprising an information element including the channel used by the device controlling the peer-to-peer wireless network.

15. A wireless computing device, comprising:
a radio configured to interface the wireless computing device to a peer-to-peer network of devices formed in accordance with a peer-to-peer networking protocol;
at least one memory and at least one processor that are respectively configured to store and execute instructions to cause the radio to:
    transmit a probe request message, the probe request message comprising an information element indicating a request for information about a group owner of the peer-to-peer network of devices;
    receive a probe reply message including information indicating a scheduled time for the group owner to exit a sleep state; and
    establish communications with the group owner, the instructions to establish the communications comprising instructions to:
        defer active scanning for the group owner until a time selected based on the scheduled time; and
        send a join request to the group owner.

16. The wireless computing device of claim 15, wherein:
the probe reply message also includes an indication of a channel used by the group owner for broadcasting management frames; and
the instructions to establish the communications with the group owner also comprises instructions to:
    monitor the channel for a management frame.

17. The wireless computing device of claim 16, wherein:
the instructions to establish the communications with the group owner also comprises instructions to:
    tune, based on the scheduled time, the wireless computing device to the channel used by the group owner for broadcasting management frames.

18. The wireless computing device of claim 16, wherein the instructions are also to cause the radio to:
    scan for the group owner prior to transmission of the probe request message; and
    selectively transmit the probe request message in response to nondetection of the group owner during the scan.

19. The wireless computing device of claim 16, wherein the instructions are also to cause the radio to:
    respond to a probe request message, the probe request message comprising an information element indicating a request for information about the group owner of the peer-to-peer network of devices formed in accordance with the peer-to-peer networking protocol.

20. The wireless computing device of claim 19, wherein:
the instructions to respond to the probe request message are to be conditionally executed in response to a join of the peer-to-peer group by the wireless computing device, the peer-to-peer network having group owner for which a notice of absence has been received.

* * * * *